United States Patent
Lin

(10) Patent No.: US 10,944,624 B2
(45) Date of Patent: Mar. 9, 2021

(54) CHANGING A MASTER NODE IN A BLOCKCHAIN SYSTEM

(71) Applicant: Advanced New Technologies Co., Ltd., Grand Cayman (KY)

(72) Inventor: Peng Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,033

(22) Filed: Jan. 31, 2020

(65) Prior Publication Data
US 2020/0235988 A1    Jul. 23, 2020

Related U.S. Application Data

(63) Continuation of application No. PCT/CN2020/070841, filed on Jan. 8, 2020.

(30) Foreign Application Priority Data

Jun. 28, 2019    (CN) .................. 201910576979.X

(51) Int. Cl.
*H04L 12/24* (2006.01)
*G06F 16/27* (2019.01)

(52) U.S. Cl.
CPC .......... *H04L 41/0668* (2013.01); *G06F 16/27* (2019.01); *H04L 41/0813* (2013.01)

(58) Field of Classification Search
CPC .................. H04L 41/0813; G06F 16/27
See application file for complete search history.

(56) References Cited

U.S. PATENT DOCUMENTS

| 2018/0101560 A1* | 4/2018 | Christidis | G06F 16/1837 |
| 2018/0171751 A1* | 6/2018 | Watson | E21B 34/10 |

(Continued)

FOREIGN PATENT DOCUMENTS

| CN | 107391320 A | * 11/2017 | G06F 11/2041 |
| CN | 107819749 | 3/2018 | |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Benjamin M Thieu
(74) *Attorney, Agent, or Firm* — Fish & Richardson P.C.

(57) ABSTRACT

Implementations of this specification provide a method and an apparatus for changing a master node in a blockchain system. An example method performed by a backup node in the blockchain system includes determining that an epoch change is to occur in a blockchain system, generating a random number, and in response to determining that the random number satisfies an epoch change trigger condition, sending an epoch change request message to multiple network nodes other than the backup node in the blockchain system. The backup node receives a request acknowledgement message from at least one of the multiple network nodes, the request acknowledgement message indicating that the backup node is to serve as the new master node, and in response to receiving a number of request acknowledgement messages that is greater than a predetermined number of messages, the backup node sends an epoch change acknowledgement message to the multiple network nodes.

20 Claims, 12 Drawing Sheets

(56) References Cited

U.S. PATENT DOCUMENTS

2019/0013933 A1* 1/2019 Mercuri .................. G06F 16/27
2019/0179939 A1* 6/2019 Govindarajan ......... G06F 16/27

FOREIGN PATENT DOCUMENTS

| CN | 108306760 A | * | 7/2018 | ............. H04L 67/32 |
| CN | 109918261 | | 6/2019 | |
| CN | 106060036 B | * | 7/2019 | ........... H04L 63/205 |
| CN | 110351133 | | 10/2019 | |
| TW | 201833855 | | 9/2018 | |
| WO | WO 2019072294 | | 4/2019 | |

OTHER PUBLICATIONS

Nakamoto, "Bitcoin: A Peer-to-Peer Electronic Cash System," www.bitcoin.org, 2005, 9 pages.

International Search Report and Written Opinion in PCT Appln No. PCT/CN2020/070841, dated Mar. 31, 2020, 15 pages (with English translation).

* cited by examiner

<REQUEST, op, timestamp, cid, signature-c>
<<PRE-PREPARE, epoch, seq, D(m), signature-p>, m , j>
<PREPARE, epoch, seq, D(m), i, signature-i>
<COMMIT, epoch, seq, D(m), p, signature-p>
<REPLY, r, i, signature-i>

FIG. 4

VF<epoch+1, j, random_num, random_num_proof>
EC<epoch+1, E, W, j>
E{<epoch, seq, sign_proof, i>}
W{<epoch, seq, tx_root_hash, I, sign_proofs>}
NE<epoch+1, j, seq, E', W'>

FIG. 8

CHANGING A MASTER NODE IN A BLOCKCHAIN SYSTEM

CROSS-REFERENCE TO RELATED APPLICATIONS

This application is a continuation of PCT Application No. PCT/CN2020/070841, filed on Jan. 8, 2020, which claims priority to Chinese Patent Application No. 201910576979.X, filed on Jun. 28, 2019, and each application is hereby incorporated by reference in its entirety.

TECHNICAL FIELD

The present disclosure relates to the field of blockchain technologies, and in particular, to a method and an apparatus for changing a master node in a blockchain system.

BACKGROUND

A distributed ledger (DL) is a database that is shared, replicated, and synchronized between members (also referred to as "nodes") of a distributed ledger system (DLS). The DL records transactions between the members of the DLS, such as exchange of assets or data. The DLS is a decentralized distributed ledger system. In the DLS, each node copies and stores a ledger. The ledger is separately updated at each node and does not need to be maintained by a central node.

The DLS can also be referred to as a consensus network, a blockchain network, and/or a blockchain system. Examples of the blockchain system can include a public blockchain system, a private blockchain system, and a consortium blockchain system. The public blockchain is a blockchain that is open to all people or entities. In the public blockchain system, any person or entity can read data, send a transaction, and effectively confirm a transaction. The private blockchain is also referred to as a dedicated blockchain. The private blockchain is an undisclosed "blockchain". Generally, a node can join the private blockchain system only after the node is authorized. In addition, a write permission of each node in the private blockchain system is controlled strictly, and a read permission can be opened to the public selectively depending on a demand. The consortium blockchain is a blockchain that is managed jointly by multiple institutions. Each organization or institution manages one or more nodes. Data of the organization or institution can only be read, written, and sent by different institutions in the system.

The blockchain system relies on a consensus mechanism to achieve data consistency among nodes in the blockchain system. For example, if a certain node in the blockchain system needs to process a transaction, consensus processing is performed in the blockchain system for a proposal corresponding to the transaction to reach agreement among all nodes of the blockchain system.

When consensus processing is performed in the blockchain system, one node in the blockchain system serves as a master node and the other nodes in the blockchain system serve as backup nodes. The master node sends a to-be-agreed proposal to all backup nodes. After receiving the to-be-agreed proposal, all the backup nodes perform consensus confirmation on the proposal, and return consensus confirmation results to the master node. Based on the received consensus confirmation results, the master node determines whether the consensus succeeds.

In the consensus process, it is possible that a current master node does evil, or the current master node encounters a communication fault (that is, the current master node fails). As a result, the current consensus processing cannot be completed normally. In such case, a master changing process needs to be initiated to re-elect a new master node from the backup nodes, and the new master node will re-initiate and complete the consensus processing.

After the current master node fails, multiple backup nodes initiate a master changing request to contend for the master node. How to efficiently implement master changing becomes a problem to be solved urgently in the consensus process.

SUMMARY

In view of the previous description, the present disclosure provides a method and an apparatus for changing a master node in a blockchain system. Using the method and apparatus can reduce the probability of a ballot allocation problem caused when multiple backup node devices concurrently initiate a master changing request, thereby improving master changing efficiency.

According to an aspect of the present disclosure, a method for changing a master node in a blockchain system is provided, where the blockchain system includes multiple network nodes, the multiple network nodes include the master node and at least one backup node, and the method includes the following: when determining, at a backup node, that an epoch change is needed, generating, by the backup node, a first random number, where the epoch change causes a current epoch based on a current master node to be changed to a new epoch based on a new master node; sending, by the backup node, an epoch change request message to multiple network nodes other than the backup node in the blockchain system if the first random number satisfies an epoch change trigger condition, where the epoch change request message indicates a request for changing the current epoch based on the current master node to the new epoch based on the backup node serving as the new master node; receiving, at the backup node, a request acknowledgment message from at least one of the multiple network nodes, where the request acknowledgment message indicates that the backup node serves as the new master node; and sending, by the backup node, an epoch change acknowledgment message to the multiple network nodes in response to the fact that the number of received verification success messages is greater than a predetermined number.

Optionally, in an example of the previous aspect, the determining, at a backup node, that an epoch change is needed includes the following: determining that the epoch change is needed in response to detecting at the backup node that first consensus processing for a first to-be-agreed proposal in the current epoch has not been completed within a predetermined time period.

Optionally, in an example of the previous aspect, the epoch change request message includes the first random number and proof information of the first random number, the first random number and the proof information of the first random number are generated by using a verifiable random function algorithm based on a second random number and a proposal number of the first to-be-agreed proposal, and the second random number is a random number generated in a master node changing process of selecting a current master node device as the master node device in the blockchain system; and request acknowledgment processing at the multiple network nodes is based on the first random number and the proof information of the first random number.

Optionally, in an example of the previous aspect, the epoch change trigger condition includes the following: the first random number is less than a first predetermined threshold; or the first random number is greater than a second predetermined threshold.

Optionally, in an example of the previous aspect, the request acknowledgment message includes the proposal number of the first to-be-agreed proposal and a node identifier of a network node sending the request acknowledgment message.

Optionally, in an example of the previous aspect, the first consensus processing includes three-stage consensus processing, and the request acknowledgment message further includes second-stage consensus commitment information and third-stage consensus commitment information that are made by the network node sending the request acknowledgment message during the first consensus processing.

Optionally, in an example of the previous aspect, the epoch change acknowledgment message includes the proposal number of the first to-be-agreed proposal and a node identifier of the backup node.

Optionally, in an example of the previous aspect, the epoch change acknowledgment message further includes a second-stage consensus commitment information set and a third-stage consensus commitment information set that are made by each network node sending the request acknowledgment message during the first consensus processing.

According to another aspect of the present disclosure, a method for changing a master node in a blockchain system is provided, where the blockchain system includes multiple network nodes, the multiple network nodes include the master node and at least one backup node, and the method includes the following: receiving, at a network node, an epoch change request message from a backup node, where the epoch change request message indicates a request for changing a current epoch based on a current master node to a new epoch based on the backup node serving as a new master node; performing, at the network node, epoch change request verification on the epoch change request message; sending, by the network node, a request acknowledgment message to the backup node after the epoch change request verification succeeds, where the request acknowledgment message indicates that the backup node serves as the new master node; and receiving an epoch change acknowledgment message from the backup node device, where the epoch change request message is sent by the backup node device when a first random number satisfies an epoch change trigger condition, the first random number is generated at the backup node device when it is determined that an epoch change is needed, and the epoch change acknowledgment message is sent by the backup node in response to the fact that the number of request acknowledgment messages received by the backup node device from a network node other than the backup node in the blockchain system exceeds a predetermined number.

Optionally, in an example of the previous aspect, the determining that an epoch change is needed includes the following: determining that the epoch change is needed in response to detecting at the backup node that first consensus processing for a first to-be-agreed proposal in the current epoch has not been completed within a predetermined time period.

Optionally, in an example of the previous aspect, the epoch change request message includes the first random number and proof information of the first random number, the first random number and the proof information of the first random number are generated by using a verifiable random function algorithm based on a second random number and a proposal number of the first to-be-agreed proposal, and the second random number is a random number generated in a master node changing process of selecting a current master node device as the master node device in the blockchain system; and the performing epoch change request verification on the epoch change request message includes the following: performing the epoch change request verification on the epoch change request message based on the first random number and the proof information of the first random number.

Optionally, in an example of the previous aspect, a request authentication message includes the proposal number of the first to-be-agreed proposal and a node identifier of a network node sending the request authentication message.

Optionally, in an example of the previous aspect, the request authentication message further includes second-stage consensus commitment information and third-stage consensus commitment information that are made by the network node sending the request authentication message during the first consensus processing.

Optionally, in an example of the previous aspect, the epoch change acknowledgment message includes the proposal number of the first to-be-agreed proposal and a node identifier of the backup node.

Optionally, in an example of the previous aspect, the epoch change acknowledgment message further includes a second-stage consensus commitment information set and a third-stage consensus commitment information set that are made by each network node sending the request authentication message during the first consensus processing.

Optionally, in an example of the previous aspect, the receiving, at a network node, an epoch change request message from a backup node includes the following: receiving, at the network node, at least two epoch change request messages from at least two backup nodes, where the epoch change request message includes a first random number; and the performing epoch change request verification on the epoch change request message includes the following: determining a to-be-verified epoch change request message based on first random numbers of the at least two epoch change request messages; and performing epoch change request verification on the determined to-be-verified epoch change request message.

According to another aspect of the present disclosure, an apparatus for changing a master node in a blockchain system is provided, where the blockchain system includes multiple network nodes, the multiple network nodes include the master node and at least one backup node, the apparatus is located in the backup node, and the apparatus includes the following: a random number generation unit, configured to generate a first random number when it is determined that an epoch change is needed, where the epoch change causes a current epoch based on a current master node to be changed to a new epoch based on a new master node; an epoch change request message sending unit, configured to send an epoch change request message to multiple network nodes other than the backup node in the blockchain system if the first random number satisfies an epoch change trigger condition, where the epoch change request message indicates a request for changing the current epoch based on the current master node to the new epoch based on the backup node serving as the new master node; a request acknowledgment message receiving unit, configured to receive a request acknowledgment message from at least one of the multiple network nodes, where the request acknowledgment message indicates that the backup node serves as the new master node; and an epoch change acknowledgment message sending unit, configured to send an epoch change acknowledgment message to the multiple network nodes in response to the fact that the number of received verification success messages is greater than a predetermined number.

Optionally, in an example of the previous aspect, the apparatus can further include an epoch change determining unit, configured to determine that the epoch change is needed in response to detecting that first consensus processing for a first to-be-agreed proposal in the current epoch has not been completed within a predetermined time period.

Optionally, in an example of the previous aspect, the epoch change request message includes the first random number and proof information of the first random number, the first random number and the proof information of the first random number are generated by using a verifiable random function algorithm based on a second random number and a proposal number of the first to-be-agreed proposal, and the second random number is a random number generated in a master node changing process of selecting a current master node device as the master node device in the blockchain system; and request acknowledgment processing at the multiple network nodes is based on the first random number and the proof information of the first random number.

Optionally, in an example of the previous aspect, the request acknowledgment message includes the proposal number of the first to-be-agreed proposal and a node identifier of a network node sending the request acknowledgment message.

Optionally, in an example of the previous aspect, the first consensus processing includes three-stage consensus processing, and the request acknowledgment message further includes second-stage consensus commitment information and third-stage consensus commitment information that are made by the network node sending the request acknowledgment message during the first consensus processing.

Optionally, in an example of the previous aspect, the epoch change acknowledgment message includes the proposal number of the first to-be-agreed proposal and a node identifier of the backup node.

Optionally, in an example of the previous aspect, the epoch change acknowledgment message further includes a second-stage consensus commitment information set and a third-stage consensus commitment information set that are made by each network node sending the request acknowledgment message during the first consensus processing.

According to another aspect of the present disclosure, an apparatus for changing a master node in a blockchain system is provided, where the blockchain system includes multiple network nodes, the multiple network nodes include the master node and at least one backup node, the apparatus is located in a network node other than a backup node serving as a new master node during request processing, and the apparatus includes the following: an epoch change request message receiving unit, configured to receive an epoch change request message from a backup node, where the epoch change request message indicates a request for changing a current epoch based on a current master node to a new epoch based on the backup node serving as the new master node; an epoch change request verification unit, configured to perform epoch change request verification on the epoch change request message; a request acknowledgment message sending unit, configured to send a request acknowledgment message to the backup node after the epoch change request verification succeeds, where the request acknowledgment message indicates that the backup node serves as the new master node; and an epoch change acknowledgment message receiving unit, configured to receive an epoch change acknowledgment message from the backup node device, where the epoch change request message is sent by the backup node device when a first random number satisfies an epoch change trigger condition, the first random number is generated at the backup node device when it is determined that an epoch change is needed, and the epoch change acknowledgment message is sent by the backup node in response to the fact that the number of request acknowledgment messages received by the backup node device from a network node other than the backup node in the blockchain system exceeds a predetermined number.

Optionally, in an example of the previous aspect, the epoch change request message receiving unit is configured to: receive an epoch change request message from at least two backup node devices, where the epoch change request message includes a first random number; and the epoch change request verification unit includes the following: an epoch change request message determining module, configured to determine a to-be-verified epoch change request message based on first random numbers of the at least two epoch change request messages; and an epoch change request verification module, configured to perform epoch change request verification on the determined to-be-verified epoch change request message.

According to another aspect of the present disclosure, a blockchain node is provided, including the following: the above-described apparatus for changing a master node in a blockchain system, where the apparatus is located at a backup node; and/or the above-described apparatus for changing a master node in a blockchain system, where the apparatus is located at a network node.

According to another aspect of the present disclosure, a computing device is further provided, including the following: at least one processor; and a memory, where the memory stores an instruction, and when the instruction is executed by the at least one processor, the at least one processor is enabled to perform the above-described method for changing a master node in a blockchain system, where the method is applied to a backup node.

According to another aspect of the present disclosure, a machine readable storage medium is further provided, where the machine readable storage medium stores an executable instruction, and when the instruction is executed, the machine is enabled to perform the above-described method for changing a master node in a blockchain system, where the method is applied to a backup node.

According to another aspect of the present disclosure, a computing device is further provided, including the following: at least one processor; and a memory, where the memory stores an instruction, and when the instruction is executed by the at least one processor, the at least one processor is enabled to perform the above-described method for changing a master node in a blockchain system, where the method is applied to a network node.

According to another aspect of the present disclosure, a machine readable storage medium is further provided, where the machine readable storage medium stores an executable instruction, and when the instruction is executed, the machine is enabled to perform the above-described method for changing a master node in a blockchain system, where the method is applied to a network node.

BRIEF DESCRIPTION OF DRAWINGS

The essence and advantages of the present disclosure can be further understood with reference to the following accompanying drawings. In the accompanying drawings, similar components or features can have the same reference numerals. The accompanying drawings are intended to provide a further understanding of the implementations of the present disclosure and constitute a part of the present specification. The accompanying drawings and the following specific implementations are jointly used to explain the implementations of the present disclosure, but do not constitute a limitation on the implementations of the present disclosure. In the drawings:

FIG. 4 is an example flowchart illustrating a consensus process, according to an implementation of the present disclosure;

FIG. 8 is an example schematic diagram of message transmission between network nodes of a blockchain system, according to an implementation of the present disclosure;

DESCRIPTION OF IMPLEMENTATIONS

Figure 1:
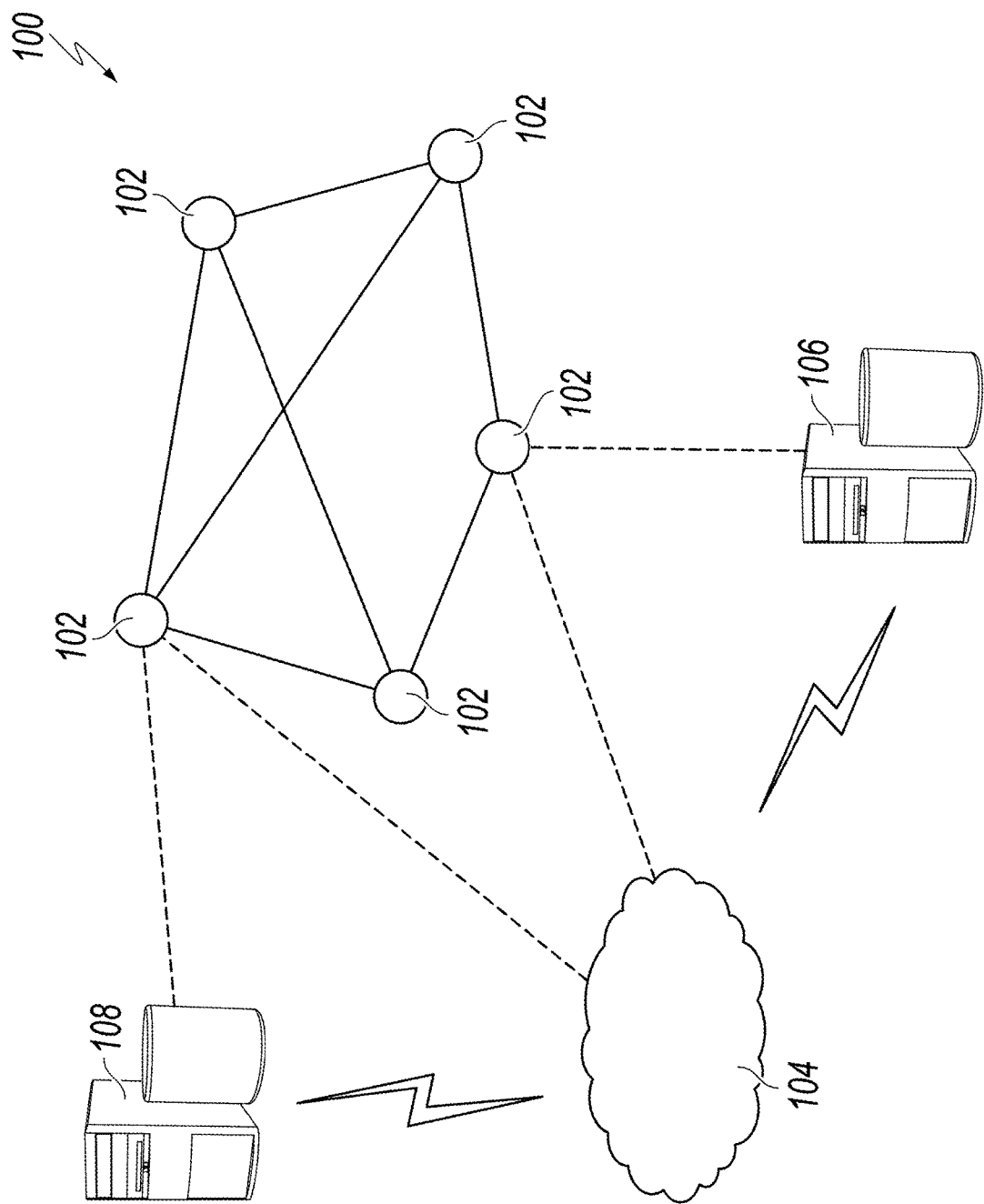
FIG. 1 is an example schematic diagram illustrating an environment for changing a master node in a blockchain system, according to an implementation of the present disclosure.

The subject matters described in the present specification are discussed in the following with reference to example implementations. It should be understood that the discussion of these implementations is merely intended to enable a person skilled in the art to better understand the subject matters described in the present specification, and is not a limitation on the protection scope, applicability, or examples set forth in the claims. The functions and arrangements of the elements under discussion can be changed without departing from the protection scope of the present disclosure. Depending on a demand, examples can be omitted or replaced, or various processes or components can be added to the examples. In addition, the features described in relation to some examples can be combined in other examples.

As used in the present specification, the term "include" and its variants represent open terms with a meaning of "including but not limited to". The term "based on" means "at least partially based on". The terms "one implementation" and "an implementation" represent "at least one implementation". The term "another implementation" means "at least one other implementation". The terms "first", "second", etc. can refer to different or identical objects. The following can include other definitions, explicit or implied. Unless explicitly stated in the context, the definition of one term is consistent throughout the specification.

A blockchain is a chained data structure that is obtained by combining sequentially connected data blocks in chronological order. By using cryptography, the blockchain ensures that data blocks cannot be tampered with or forged. The blockchain includes one or more blocks. Each block in the blockchain is linked to a previous block immediately preceding the block by using an encrypted hash that includes the previous block in the blockchain. Each block further includes a timestamp, an encrypted hash of the block, and one or more transactions.

Transactions that have been verified by nodes of a blockchain network are hashed to form a Merkle tree. In the Merkle tree, data at a leaf node is hashed, and for each branch of the Merkle tree, all hash values for the branch are cascaded at the root of the branch. The previous processing is performed for the Merkle tree until the root node of the entire Merkle tree is reached. The root node of the Merkle tree stores the hash values representing all the data in the Merkle tree. When a hash value declares to be a transaction stored in the Merkle tree, the hash value can be quickly verified by determining whether the hash value is consistent with the structure of the Merkle tree.

A blockchain is a data structure used to store transactions. A blockchain network is a computing node network used to manage, update, and maintain one or more blockchain structures. As described above, the blockchain network can include a public blockchain network, a private blockchain network, or a consortium blockchain network.

In the public blockchain network, the consensus process is controlled by a node of the consensus network. For example, tens of thousands of entities can perform cooperative processing in the public blockchain network, and each entity operates at least one node in the public blockchain network. Therefore, the public blockchain network can be considered a public network of the participating entities. In some examples, most entities (nodes) need to sign each block in order and add the signed block to the blockchain of the blockchain network. Examples of the public blockchain network can include a specific peer-to-peer payment network.

The public blockchain network supports public transactions. The public transactions are shared among all nodes in the public blockchain network and stored in the global blockchain. The global blockchain is a blockchain replicated across all nodes. In order to reach consensus (for example, adding a block to the blockchain is agreed on), a consensus protocol is implemented in the public blockchain network. Examples of the consensus protocol include, but are not limited to, proof-of-work (POW), proof-of-stake (POS), and proof-of-authority (POA). In the present disclosure, POW is used as a non-limitative example.

The private blockchain network is provided for specific entities. The read and write permissions of each node in the private blockchain network are strictly controlled. Therefore, the private blockchain network is usually referred to as a licensed network. The private blockchain network imposes a limitation on a network participant and a level of network participation (for example, only in some transactions). In the private blockchain network, various types of access control mechanisms can be used (for example, existing participants vote on adding new entities, regulatory authorities control licensing, etc.).

The consortium blockchain network is private among participating entities. In the consortium blockchain network, the consensus process is controlled by an authorized node. For example, a consortium of several (e.g., 10) entities (e.g., financial institutions, insurance companies) can operate the consortium blockchain network, and each entity operates at least one node in the consortium blockchain network. Therefore, the consortium blockchain network can be considered a private network of the participating entities. In some examples, each participating entity (node) needs to sign each block in order and add the block to the blockchain. In some examples, each block can be signed by a subset (for example, at least seven entities) of participating entities (nodes), and added to the blockchain.

In the present disclosure, implementations of the present disclosure are described in detail with reference to the consortium blockchain network. However, it can be expected that the implementations of the present disclosure can be implemented in any suitable blockchain network.

The blockchain is a tamper-resistant shared digital ledger that records transactions in public or private peer-to-peer networks. The ledger is distributed to all the member nodes in the network, and the asset transaction history that occurs in the network is permanently recorded in the block.

The consensus mechanism ensures that all network nodes in a distributed blockchain network execute transactions in the same order and then write the transactions into the same ledger. The consensus model is intended to address Byzantine issues. With respect to Byzantine issues, components such as servers or network nodes in the distributed blockchain network may fail, or intentionally propagate false information to other nodes. Because other network nodes need to first agree on which network node fails first, it is difficult for other network nodes to declare the component failed and exclude the component from the blockchain network.

In the context of the distributed system, a Byzantine fault tolerance (BFT) mechanism ensures that, even if a malicious component in the distributed system fails or propagates false information to other peer entities, the distributed system can still work normally and reach sufficient consensus. However, an existing BFT mechanism have been proved inefficient in many aspects. For example, when trying to address the Byzantine issue, the existing BFT mechanism increases the implementation complexity of the distributed blockchain network, thereby increasing the communication delay between network nodes of the distributed blockchain network. Practical Byzantine fault tolerance (PBFT) is an improvement to the existing BFT consensus mechanism.

In the PBFT model, all nodes are arranged in order. One node is the master node (leader) and the other nodes are backup nodes. All nodes in the distributed system communicate with each other and make most honest nodes agree on the status of the system. A node not only needs to prove that a message is received from a particular peer node, but also needs to verify that the message is not modified during transmission.

To make the PBFT model work normally, assume that the number of malicious nodes in the distributed system cannot be equal to or exceed one-third of all nodes in the system. The more nodes in the system, the less likely the number of malicious nodes is to approach one-third of all the nodes. As long as a maximum of $(n-1)/3$ nodes are malicious or faulty, the algorithm can work effectively, where n represents the total number of nodes.

Each round of PBFT consensus (referred to as "view" or "epoch") includes four stages: (1) A client sends a request (e.g., transaction request) to the master node to invoke a service operation. (2) The master node multicasts the request to backup nodes. (3) The master node and the backup nodes execute the request and then send a reply to the client. (4) The client waits for f+1 identical results from different nodes, where f represents the maximum number of nodes that may be faulty.

The final result is that all honest nodes agree on the record, that is, acceptance or rejection. In each round of PBFT consensus, the master node can be a different network node. For example, if the master node does not multicast a request for a specific continuous time period, an epoch change (or view change) protocol can be used to replace the master node of the current round of PBFT. For example, assume that an epoch change is needed. A backup node next following the current master node can be selected as a new master node (i.e., a ring change or a cyclic change).

However, when the master node is replaced by using the cyclic change method, if consecutive malicious nodes exist, a delay caused by seeking an honest master node will be introduced into a blockchain service. For example, if the first network node is a malicious node when it is selected as a new master node, the first network node cannot be used as the new master node. According to the cyclic change method, the second network node next following the first network node is then selected as the new master node. In such case, if the second network node is also a malicious node, another network node following the second network node needs to be selected, and verification is performed to check whether the another network node is suitable for serving as the master node. Such process continues until an honest new master node is identified. As such, a significant delay is introduced into the blockchain service.

To solve the previous problems associated with the existing BFT consensus mechanism and PBFT consensus mechanism, implementations of the present disclosure provide an improved master node change technology.

For example, in the master node change process discussed below, a first random number is generated at each backup node when it is determined that an epoch change is needed. For each backup node, the backup node sends an epoch change request message to the other network nodes in the blockchain system only when the first random number generated at the backup node satisfies an epoch change trigger condition. It can help select a fault-free new master node in a timely manner, without introducing a delay caused by seeking the fault-free new master node. In addition, because the first random number generated at the backup node is random, the number of backup nodes that can satisfy the epoch change trigger condition at the same time is small. Therefore, a ballot allocation problem caused when multiple backup node devices concurrently initiate a master changing request can be alleviated. It can further improve efficiency of the blockchain system in providing a blockchain service.

FIG. 1 is an example schematic diagram illustrating an environment 100 for changing a master node in a blockchain system, according to an implementation of the present disclosure. In some examples, the environment 100 enables entities to participate in a blockchain network 102. As shown in FIG. 1, the environment 100 includes a network 104, and computing devices/systems 106 and 108. In some examples, the network 104 can include a local area network (LAN), a wide area network (WAN), the Internet, or a combination thereof, and can be connected to a website, a user device (e.g., a computing device), and a backend system. In some examples, the network 104 can be accessed by using a wired and/or wireless communication link. In some examples, the computing devices/systems 106 and 108 communicate with each other through the network 104 and communicate with the blockchain network 102 through the network 104. Nodes (or node devices) in the blockchain network 102 communicate through the network 104. Generally, the network 104 represents one or more communications networks. In some cases, the computing devices/systems 106 and 108 can be nodes of a cloud computing system (not shown), or each of the computing devices/systems 106 and 108 can be a stand-alone cloud computing system that includes multiple computers interconnected through the network 104 and serves as a distributed processing system.

In the illustrated examples, each of the computing devices/systems 106 and 108 can include any suitable computing system that can serve as a node in the blockchain network 102. Examples of the computing devices/systems include, but are not limited to, servers, desktop computers, notebook computers, tablet computers, smartphones, etc. In some examples, one or more computer-implemented services for interacting with the blockchain network 102 can be installed on the computing devices/systems 106 and 108. For example, a service of a first entity (for example, user A) can be installed on the computing device/system 106, such as a transaction management system used by the first entity to manage transactions between the first entity and one or more other entities (for example, other users). A service of a second entity (for example, user B) can be installed on the computing device/system 108, such as a transaction management system used by the second entity to manage transactions between the second entity and one or more other entities (for example, other users). In the example of FIG. 1, the blockchain network 102 is represented as a peer-to-peer network of nodes, and the computing devices/systems 106 and 108 serve as nodes of the first entity and the second entity participating in the blockchain network 102, respectively.

Figure 2:
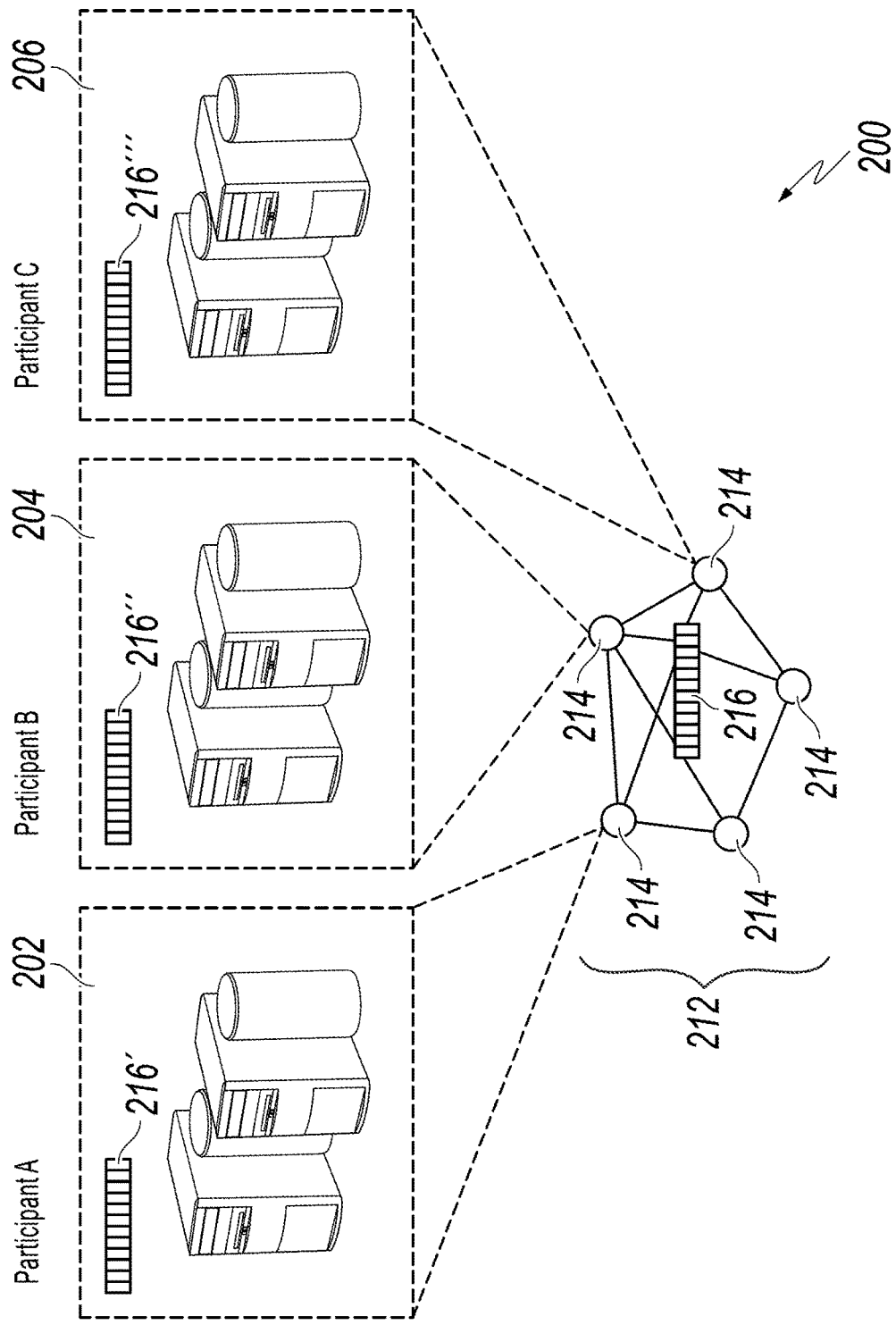
FIG. 2 is an example schematic diagram illustrating a system architecture for changing a master node in a blockchain system, according to an implementation of the present disclosure.

FIG. 2 is an example schematic diagram illustrating a system architecture 200 for changing a master node in a blockchain system, according to an implementation of the present disclosure. Examples of the system architecture 200 include participant systems 202, 204, and 206 corresponding to participant A, participant B, and participant C, respectively. Each participant (e.g., user or enterprise) participates in a blockchain network 212 that is provided as a peer-to-peer network. The blockchain network 212 includes multiple nodes 214, at least some of the nodes 214 record information in the blockchain 216, and the recorded information is unchangeable. Although a single blockchain 216 is schematically shown in the blockchain network 212, multiple copies of the blockchain 216 can be provided and maintained in the blockchain network 212, as will be described later in detail.

In the shown example, the participant systems 202, 204, and 206 are provided by participant A, participant B, and participant C, respectively, or are provided as participant A, participant B, and participant C, and serve as corresponding nodes 214 in the blockchain network 212. As used here, anode usually refers to a single system (e.g., a computer or a server) connected to the blockchain network 212, and enables a corresponding participant to participate in the blockchain network. In the example shown in FIG. 2, the participant corresponds to each node 214. However, one participant can operate multiple nodes 214 in the blockchain network 212, and/or multiple participants can share a single node 214. In some examples, the participant systems 202, 204, and 206 communicate with the blockchain network 212 by using a protocol (such as HyperText Transfer Protocol Security (HTTPS)) and/or remote procedure call (RPC), or communicate through the blockchain network 212.

Nodes 214 can have different degrees of participation in the blockchain network 212. For example, some nodes 214 can participate in a consensus process (for example, as miner nodes that add blocks to the blockchain 216), whereas other nodes 214 do not participate in the consensus process. In another example, some nodes 214 store a complete copy of the blockchain 216, whereas other nodes 214 store only a partial copy of the blockchain 216. In the example of FIG. 2, the participant systems 202, 204, and 206 store complete copies 216', 216", and 216'" of the blockchain 216, respectively.

A blockchain (for example, the blockchain 216 in FIG. 2) consists of a series of blocks, and each block stores data. Examples of data can include transaction data representing transactions between two or more participants. In the present disclosure, the transaction is used as a non-limitative example. It can be expected that, any appropriate data (e.g., a document, an image, a video, and an audio) can be stored in the blockchain. Examples of transactions can include but are not limited to the exchange of valuable things (e.g., assets, products, services, currencies, etc.). Transaction data is unchangeably stored in the blockchain.

The transaction data is hashed before being stored in a block. Hashing is a process of converting the transaction data (provided as string data) into a fixed-length hash value (also provided as string data). After the transaction data is hashed, even if the transaction data is slightly changed, a completely different hash value will be obtained. A hash value is usually generated by hashing transaction data using a hash function. Examples of the hash function include but are not limited to a secure hash algorithm (SHA)-256 which outputs a 256-bit hash value.

Transaction data of multiple transactions is hashed and stored in blocks. For example, two pieces of transaction data are hashed to obtain two hash values, and then the two hash values obtained are hashed to obtain another hash value. The process is repeated until a single hash value is obtained for all transactions to be stored in the block. The hash value is referred to as a Merkle root hash, and is stored in a header of the block. Any change in the transaction will result in a change in the hash value of the transaction, which in turn will result in a change in the Merkle root hash value.

A block is added to the blockchain by using a consensus protocol. Multiple nodes in the blockchain network participate in the consensus protocol and contend for adding a block to the blockchain. Such nodes are referred to as miner nodes (or ledger nodes). The POW described above is used as a non-limitative example.

A miner node performs a consensus process to add a transaction (a corresponding block) to the blockchain. Although multiple miner nodes participate in the consensus process, only one miner node can write the block into the blockchain. In other words, miner nodes contend for adding their blocks to the blockchain in the consensus process. More specifically, miner nodes periodically collect to-be-processed transactions from a transaction pool (for example, until a predetermined limit for the number of transactions that can be included in the block is reached, if any). The transaction pool includes transaction messages from participants in the blockchain network. The miner node creates a block and adds a transaction to the block. Before adding a transaction to the block, the miner node checks whether the to-be-added transactions include a transaction in the block of the blockchain. If the transaction has been added to another block, the transaction is discarded.

The miner node generates a block header, hashes all transactions in the block, and combines hash values in pairs to generate further hash values until a single hash value (Merkle root hash) is obtained for all the transactions in the block. Then, the Merkle root hash is added to the block header. The miner node also determines a hash value of a latest block in the blockchain (namely, the last block added to the blockchain). The miner node can further add a random number (noune value) and a timestamp to the block header. In the mining process, the miner node tries to identify a hash value that satisfies a needed parameter. The miner node constantly changes the nonce value until the hash value that satisfies the needed parameter is identified.

Each miner node in the blockchain network tries to identify the hash value that satisfies the needed parameter, and contends with each other in such way. Finally, one miner node identifies the hash value that satisfies the needed parameter, and announces the hash value to all other miner nodes in the blockchain network. The other miner nodes verify the hash value. If determining the hash value as correct, the other miner nodes verify each transaction in the block, accept the block, and attach the block to their blockchain copies. As such, the global status of the blockchain is agreed on by all the miner nodes in the blockchain network. The previous process is a POW consensus protocol.

In the example provided in FIG. 2, participant A wants to send a specific amount of funds to participant B. Participant A generates a transaction message and sends the transaction message to the blockchain network, and the transaction message is added to the transaction pool. Each miner node in the blockchain network creates a block, obtains a transaction from the transaction pool, and adds the transaction to the block. As such, the transaction published by participant A is added to the block of the miner node.

In some blockchain networks, a cryptography technology is implemented to maintain transaction privacy. For example, if two nodes want to maintain transaction privacy so that other nodes in the blockchain network cannot learn transaction details, the nodes can encrypt transaction data. Examples of encryption methods include but are not limited to symmetric encryption and asymmetric encryption. Symmetric encryption refers to an encryption process in which a single key is used for encryption (a ciphertext is generated based on a plaintext) and decryption (a plaintext is generated based on a ciphertext). In symmetric encryption, multiple nodes can use the same key, so each node can encrypt/decrypt transaction data.

Asymmetric encryption is encryption using a key pair. Each key pair includes a private key and a public key. The private key is known only for a corresponding node, and the public key is known for any or all other nodes in a blockchain network. A node can encrypt data by using a public key of another node, and can decrypt the encrypted data by using a private key of the another node. For example, references can be made to FIG. 1 again. Participant A can encrypt data by using a public key of participant B and send the encrypted data to participant B. Participant B can decrypt the encrypted data (ciphertext) by using its private key and extract raw data (plaintext). A message encrypted by using the public key of the node can only be decrypted by using the private key of the node.

Asymmetric encryption is used to provide a digital signature, so that participants in a transaction can confirm other participants in the transaction and validity of the transaction. For example, a node can digitally sign a message, and another node can confirm, based on the digital signature of participant A, that the message is sent by the node. The digital signature can also be used to ensure that a message is not tampered with during transmission. For example, references can be made to FIG. 1 again. Participant A sends a message to participant B. Participant A generates a hash value of the message and then encrypts the hash value by using its private key, to generate a digital signature. Participant A attaches the digital signature to the message and sends the message with the digital signature to participant B. Participant B decrypts the digital signature by using the public key of participant A, thereby obtaining a corresponding hash value through decryption. Participant B hashes the received message to obtain another hash value, and then compares the two hash values. If the hash values are the same, participant B can confirm that the message is from participant A in deed and is not tampered with.

Figure 3:
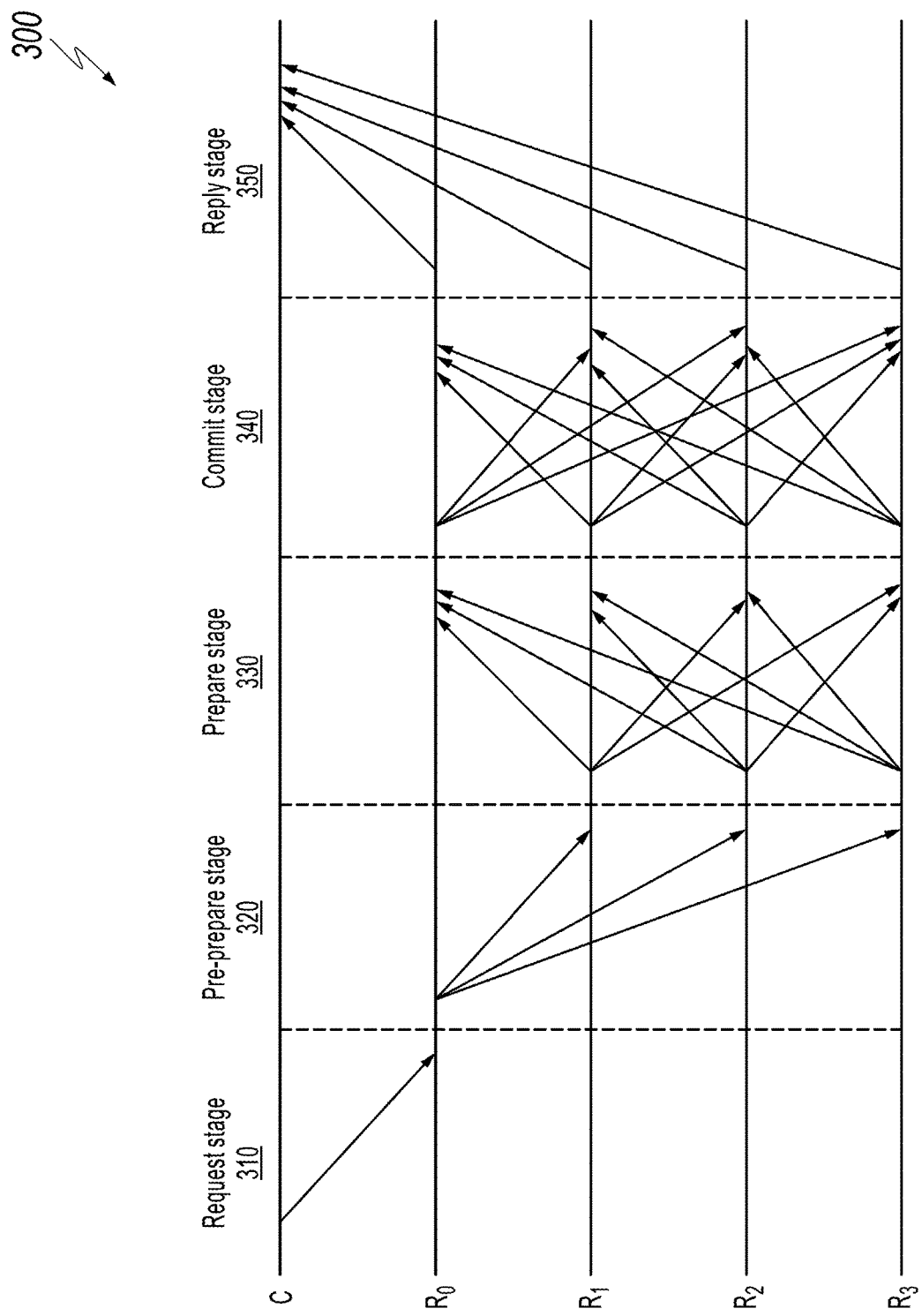
FIG. 3 is an example schematic diagram illustrating a consensus process, according to an implementation of the present disclosure.

FIG. 3 is an example schematic diagram illustrating a consensus process 300, according to an implementation of the present disclosure. As shown in FIG. 3, C represents a client, $R_0$ represents a master node of a current consensus process of a blockchain system, and $R_1$, $R_2$, and $R_3$ represent backup nodes.

At request stage 310, client C can send a transaction request to master node $R_0$. In addition, client C can send the transaction request to other nodes (such as $R_1$, $R_2$, and $R_3$) in the blockchain system (not shown in FIG. 3). Then, the other nodes forward the received transaction request to master node $R_0$.

In the present disclosure, as shown in FIG. 4, a format of the transaction request can be <REQUEST, op, timestamp, cid, signature-c>, where "REQUEST" represents a protocol ID of the transaction request; "op" represents specific request content, which can be a single request message representing a business meaning, such as "C transfers 5 yuan to someone"; "timestamp" represents a sending time of the transaction request; "cid" represents an identifier of client C; and "signature-c" represents a signature of client C.

After receiving the transaction request, master node $R_0$ performs consensus processing with backup nodes $R_1$, $R_2$, and $R_3$. The consensus processing procedure includes the following stages: pre-prepare 320, prepare 330, and commit 340.

At the pre-prepare stage 320, after receiving a specific number of transaction requests, master node $R_0$ sorts and packages the received transactions as a message m, generates a Pre-prepare message, and sends (e.g., broadcasts) the Pre-prepare message to the backup nodes $R_1$, $R_2$, and $R_3$ at a given time interval. The Pre-prepare message indicates that master node $R_0$ is starting the consensus process.

As shown in FIG. 3, master node $R_0$ sends the Pre-prepare message to other network nodes $R_1$, $R_2$, and $R_3$ in the blockchain network. It is worthwhile to note that, the consensus process 300 is shown as including four network nodes $R_0$, $R_1$, $R_2$, and $R_3$ for illustrative purposes only, and the consensus process 300 can also include any appropriate number of network nodes.

In the present disclosure, as shown in FIG. 4, a format of the Pre-prepare message can be <<PRE-PREPARE, epoch, seq, D(m), signature-p>, m, j>, where "PRE-PREPARE" represents a protocol identifier of the Pre-prepare message; "epoch" represents an era when $R_0$ serves as the master node; "seq" represents a proposal number of a to-be-agreed proposal; "D(m)" represents a digest of a request message set; "signature-p" represents a signature of $R_0$; "m" represents specific content of the request message; and "j" represents a node identifier of $R_0$.

At the prepare stage 330, after receiving the Pre-prepare message and detecting that the Pre-prepare message is valid, each backup node ($R_1$, $R_2$, or $R_3$) can store the Pre-prepare message in a local log and generate a Prepare message to respond to the Pre-prepare message, and then broadcast the generated Prepare message to other nodes. The Prepare message indicates that the backup node has received the Pre-prepare message from the master node and is sending a reply in response to the Pre-prepare message.

Correspondingly, each backup node receives a Pre-prepare message from another backup node. Backup node $R_1$ is used as an example. After receiving the Pre-prepare message from master node $R_0$, backup node $R_1$ broadcasts a generated Prepare message to master node $R_0$, and backup nodes $R_2$ and $R_3$. Correspondingly, backup node $R_1$ also receives the Prepare message from master node $R_0$, and backup nodes $R_2$ and $R_3$.

In the present disclosure, the Prepare message broadcast by the backup node can be used to represent a consensus commitment made by the backup node at the prepare stage 330.

In the present disclosure, as shown in FIG. 4, a format of the Prepare message can be <PREPARE, epoch, seq, D(m), i, signature-i>, where "PREPARE" represents a protocol identifier of the Prepare message; "i" represents a node identifier of the node sending the Prepare message; and "signature-i" represents a signature of the node sending the Prepare message. Meanings of "epoch", "seq", and "D(m)" in the Prepare message are the same as the meanings of "epoch", "seq", and "D(m)" in the Pre-prepare message.

At the commit stage 340, when a network node receives a sufficient number of Prepare messages from other network nodes, the network node determines that consensus has been reached. For example, if master node $R_0$ or backup node $R_1$, $R_2$, or $R_3$ receives Quorum (for example, 2f+1, where f represents multiple faulty network nodes) Prepare messages, it is determined that consensus is reached among network nodes. Then, master node $R_0$ or backup node $R_1$, $R_2$, or $R_3$ broadcasts a Commit message to other nodes.

In the present disclosure, as shown in FIG. 4, a format of the Commit message can be <COMMIT, epoch, seq, D(m), p, signature-p>, where "COMMIT" represents a protocol identifier of the Commit message; "p" represents a node identifier of the node sending the Commit message; and "signature-p" represents a signature of the node sending the Commit message. Meanings of "epoch", "seq", and "D(m)" in the Commit message are the same as the meanings of "epoch", "seq", and "D(m)" in the Pre-prepare message.

In the present disclosure, the node sends the Commit message and stores the Commit message in a local log to indicate a consensus commitment made by the node at the commit stage 340.

At the reply stage 350, after reaching consensus on the initiated proposal, each of the nodes participating in the consensus sequentially executes a set of ordered requests in the Pre-prepare message m in a local state machine, and returns a reply message to client C.

In the present disclosure, as shown in FIG. 4, a format of the reply message can be <REPLY, r, i, signature-i>, where "REPLY" represents a protocol identifier of the reply message; "r" represents specific reply content returned for the request; "i" represents a node identifier of the node sending the reply message; and "signature-i" represents a signature of the node sending the reply message.

Figure 5:
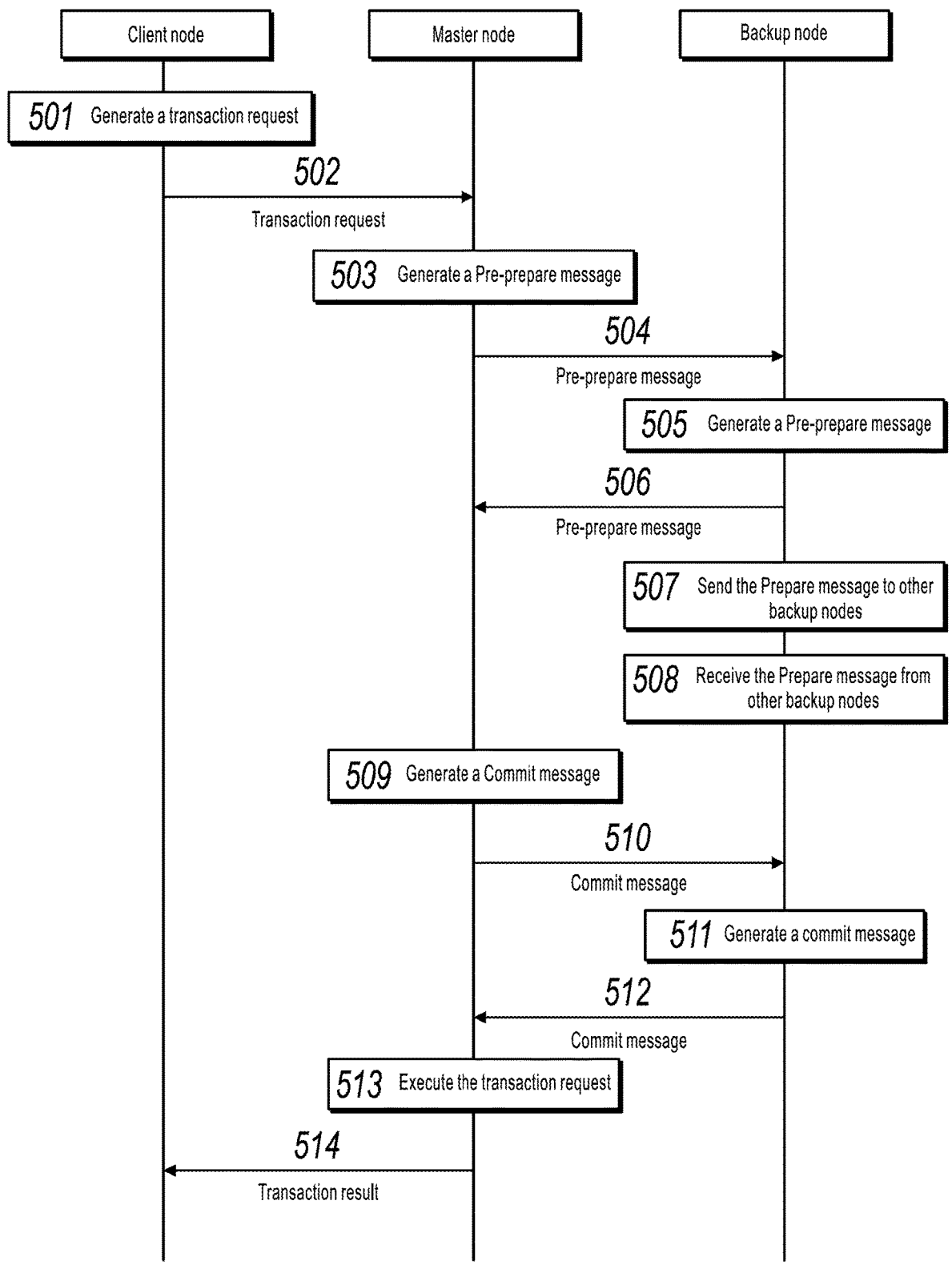
FIG. 5 is an example schematic diagram of message transmission between network nodes of a blockchain system, according to an implementation of the present disclosure.

FIG. 5 is an example flowchart illustrating a consensus process 500, according to an implementation of the present disclosure. In some implementations, the consensus process 500 can be executed by using one or more computer executable programs to be executed by one or more computing devices. It is worthwhile to note that, the following describes the consensus process 500 in the context of other accompanying drawings of the present disclosure. It should be understood that the consensus process 500 can be executed, for example, by using any suitable system, environment, software and hardware, or a combination of the system, environment, and software and hardware. In some implementations, the steps of the consensus process 500 can run in parallel, in combination, cyclically, or in any order.

The consensus process 500 can be implemented with reference to the systems 100 and 200 described in FIG. 1 and FIG. 2. In some implementations of the present disclosure, the blockchain network 102 and/or 212 includes a master node and one or more backup nodes. The blockchain network 102 and/or 212 communicates with the computing device/system 106 and/or 108, for example, a client node provides a blockchain service through the network 104. Each of the client node, master node, and backup node can be a dedicated computer or another data processing apparatus configured to execute the processes discussed in the present disclosure. For example, the client node can also be referred to as a client terminal, or a client device that interacts with a blockchain network. The client node can install, for example, a client application or client software development kit (SDK) associated with the blockchain network to access the blockchain network and communicate with the blockchain network. The master node and one or more backup nodes can also be referred to as consensus nodes or network nodes. These nodes implement consensus processing and unchangeably record information in the blockchain network.

As shown in FIG. 5, first, at block 501, the client node generates a transaction request. In some implementations of the present disclosure, the transaction request can include a request that is used to request a blockchain service from the blockchain network 102 and/or 212.

At block 502, the client node sends (e.g., multicasts) the transaction request to the master node of the blockchain network 102 and/or 212. In some implementations of the present disclosure, the master node allocates a sequence number to the transaction request to track the transaction request after receiving the transaction request from the client node.

Next, at block 503, the master node generates a Pre-prepare message. The Pre-prepare message indicates that the master node is initiating a consensus process. Then, at block

504, the master node sends (e.g., multicasts) the Pre-prepare message to other network nodes (e.g., backup nodes).

After receiving the Pre-prepare message, at block 505, each backup node detects whether the Pre-prepare message is valid (i.e., acknowledges the message) and generates a Prepare message after detecting that the Pre-prepare message is valid. The Prepare message indicates that the backup node has received the Pre-prepare message from the master node and is sending a reply in response to the Pre-prepare message. Then, at block 506, each backup node sends the generated Prepare message to the master node. At block 507, each backup node sends the Prepare message to other backup nodes. At block 508, each backup node can receive the Prepare messages from other backup nodes.

At block 509, the master node determines whether the received Prepare messages exceed a predetermined threshold, and generates a Commit message in response to the fact that the received Prepare messages exceed the predetermined threshold. The Commit message is used to indicate that the master node has accepted a predetermined number of Prepare messages and is ready to execute the transaction. In some implementations of the present disclosure, the master node determines whether the number of received Prepare messages reaches a quorum n–f or 2f+1, where n represents the total number of network nodes and f represents the maximum number of faulty nodes that the network can tolerate.

Next, at block 510, the master node sends the Commit message to each backup node. Similarly, at block 511, each backup node generates a Commit message by using the same method as the master node. Then, at block 512, the generated Commit message is sent to other network nodes. It is worthwhile to note here that, the operations of blocks 509 and 510 can be performed in parallel with the operations of blocks 511 and 512.

At block 513, the master node executes the transaction request in response to the fact that the received Commit messages exceed a predetermined threshold. In some implementations of the present disclosure, the master node determines whether the number of received Commit messages reaches a quorum (e.g., 2f+1). If the number of Commit messages reaches the quorum, the master node determines that consensus has been reached among all network nodes, and then locally executes the transaction request. In some implementations of the present disclosure, if the master node determines that the number of Commit messages does not reach the quorum, the master node determines that no consensus has been reached among all the network nodes, and does not execute the transaction request.

In some implementations of the present disclosure, each backup node can perform the same operation as the master node before executing the transaction request, such as the operation at block 513. If the backup node determines that the received Commit messages exceed a predetermined threshold, the backup node determines that consensus has been reached among network nodes, and locally executes the transaction request. In some implementations of the present disclosure, if the backup node determines that the number of received Commit messages does not reach a predetermined threshold, the backup node determines that no consensus has been reached among all the network nodes, and does not execute the transaction request.

At block 514, after executing the transaction request, the master node sends a transaction result obtained by executing the transaction request to the client node. Backup nodes that have successfully executed the transaction request locally can also send their respective transaction results to the client node.

In the consensus process, the backup node is waiting for a request from the master node. However, the master node may encounter a Byzantine fault or a crash fault, so the master node cannot broadcast a request within a predetermined time window. When a specific amount of time elapses during which no master node multicasts a request, a new master node may need to be selected to prevent the backup node from waiting indefinitely for executing the request.

In a prior-art solution for changing a master node, assume that in a current epoch, $R_0$ is the current master node device, and $R_1$, $R_2$, and $R_3$ are all backup node devices. If $R_0$ fails or does evil, a master node changing process is started. In the existing master node changing process, timers are set at backup nodes $R_1$, $R_2$, and $R_3$. If it is detected that $R_0$ fails or does evil, the backup nodes $R_1$, $R_2$, and $R_3$ start their respective timers.

Once the timer at a backup node expires, the backup node broadcasts an epoch change request message to the other network nodes in a blockchain network to request to serve as a new master node. Each backup node verifies the first received epoch change request message (i.e., voting), and then returns a verification message to the backup node that sends the epoch change request message.

In the previous master node changing process, because the epoch change request messages at the backup nodes $R_1$, $R_2$, and $R_3$ are sent in response to the timers owned by the backup nodes, multiple backup nodes may send the epoch change request messages at the same time, that is, other network nodes may receive one epoch change request message at the same time. Consequently, voting is performed on multiple backup nodes at the same time to elect a new master node, causing a ballot allocation problem.

To solve the previous problem, the present disclosure provides a method and an apparatus for changing a master node in a blockchain system. According to the method and apparatus, when it is detected that the current master node fails or does evil, a random number is generated at each backup node. In addition, the master node changing process is initiated based on whether the generated random number satisfies a master node changing trigger condition. The randomness of generating the random number can reduce the probability of a ballot allocation problem caused when multiple backup node devices concurrently initiate a master changing request, thereby improving master changing efficiency.

Figure 6:
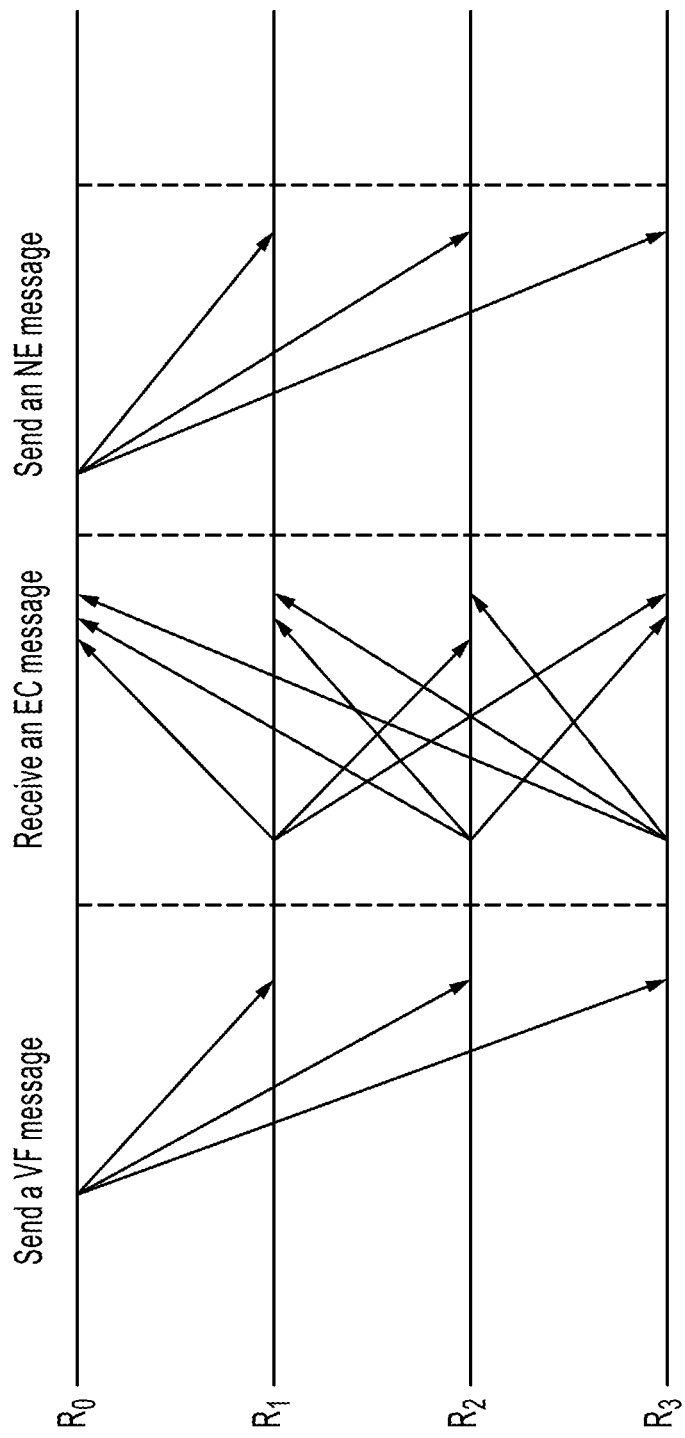
FIG. 6 is an example schematic diagram illustrating a process of changing a master node in a blockchain system, according to an implementation of the present disclosure.

FIG. 6 is an example schematic diagram illustrating a process 600 of changing a master node in a blockchain system (e.g., blockchain networks 102 and 212), according to an implementation of the present disclosure. In some implementations, the master node is associated with an epoch that includes a consensus process using the master node as a leader node. The master node change will lead to an epoch change.

In some implementations, in response to determining that the master node of the current epoch needs to be changed, the backup node of the blockchain network sends an epoch change request message to other network nodes. The epoch change request message indicates that the backup node wants to become a new master node in a new epoch. For example, as shown in FIG. 6, in response to determining that the current master node is faulty (or the current master node does evil) and an epoch change is needed, backup node $R_0$ sends the epoch change request message to other network nodes $R_1$, $R_2$, and $R_3$ in the blockchain network. A VF message is an example of the epoch change request message indicating that backup node $R_0$ requests to become a new master node. The epoch change can cause the current epoch with the current master node to be changed to a new epoch with a new master node. It is worthwhile to note that, the process 600 is implemented with reference to four network nodes for illustrative purposes only. The process 600 can be implemented with reference to any appropriate number of network nodes.

Then, each network node receives the epoch change request message from backup node $R_0$, prepares a request acknowledgment message in response to the epoch change request message, and multicasts the request acknowledgment message to other network nodes. For example, as shown in FIG. 6, network node $R_1$ receives a VF message from backup node $R_0$ and replies to backup node $R_0$ with an EC message. The EC message indicates that network node $R_1$ determines that backup node $R_0$ can become a new master node. At the same time, network node $R_1$ multicasts the EC message to other network nodes, such as network nodes $R_0$, $R_2$, and $R_3$. Similarly, network nodes $R_2$ and $R_3$ each multicast the EC message to other network nodes.

After receiving the EC messages from the other network nodes, if the number of received EC messages exceeds a predetermined threshold, backup node $R_0$ sends an epoch change acknowledgment message (NE) to the other network nodes. The NE message indicates that backup node $R_0$ serves as the master node of the new epoch.

Figure 7:
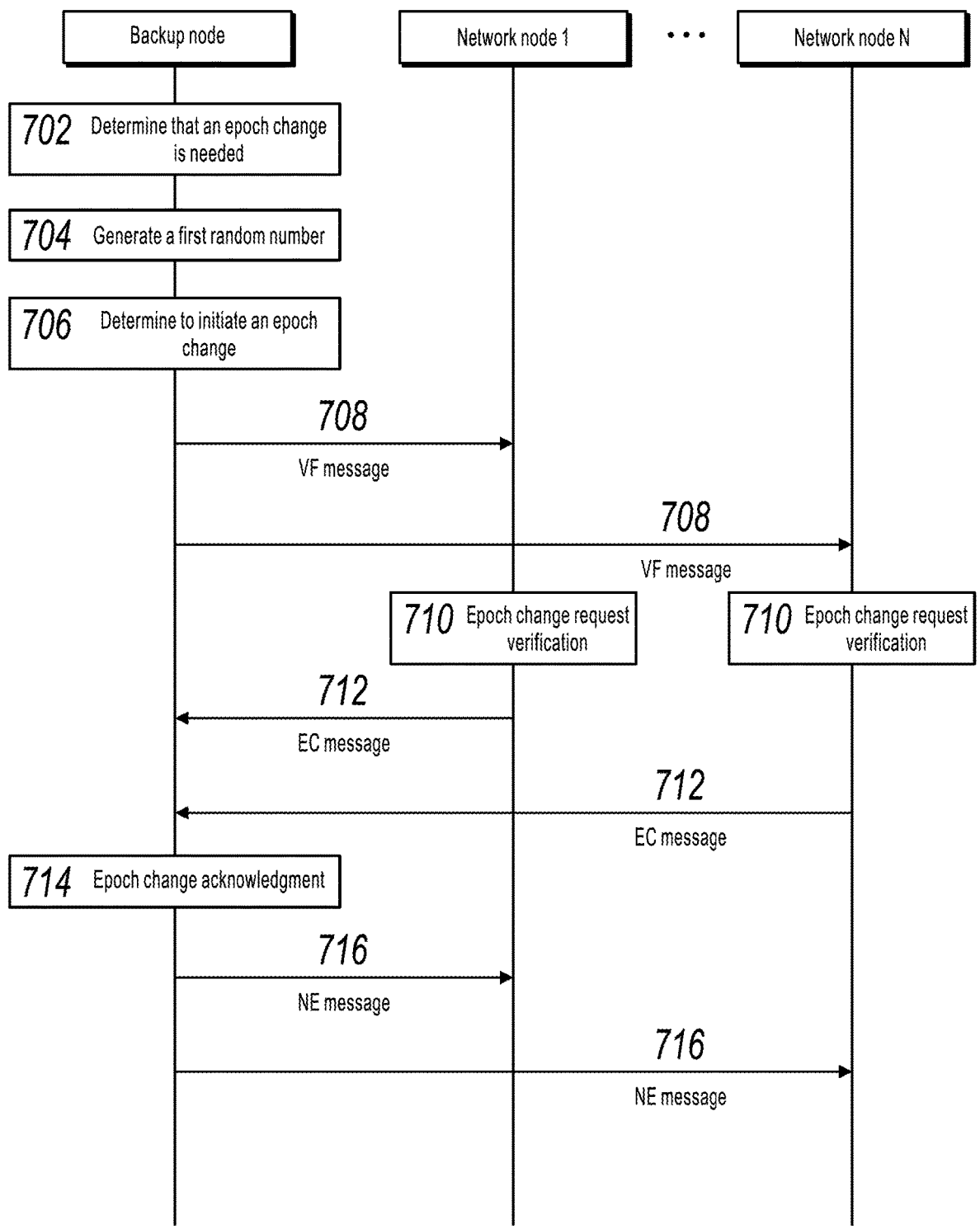
FIG. 7 is a flowchart illustrating a method for changing a master node in a blockchain system, according to an implementation of the present disclosure.

The following describes the previous epoch change process in more detail with reference to FIG. 7.

FIG. 7 is an example flowchart illustrating a method 700 for changing a master node in a blockchain system (e.g., blockchain networks 102 and 212), according to an implementation of the present disclosure. In some implementations, the example method 700 can be performed by using one or more computer executable programs to be executed by one or more computing devices. It is worthwhile to note that, the following describes the method 700 in the context of other accompanying drawings of the present disclosure. It should be understood that the method 700 can be performed, for example, by using any suitable system, environment, software and hardware, or a combination of the system, environment, and software and hardware. In some implementations, the steps of the method 700 can run in parallel, in combination, cyclically, or in any order.

As shown in FIG. 7, the method 700 starts with block 702. At block 702, the backup node determines that an epoch change is needed. The epoch change discussed here causes the current epoch with the current master node to be changed to a new epoch with a new master node. The example epoch can include a consensus process (e.g., a consensus process 300 or 400 discussed above with reference to FIG. 3 and FIG. 4) for using a master node to reach consensus among multiple network nodes. Here, the backup node can be any backup node in the blockchain system.

In some implementations of the present disclosure, the backup node determines that the epoch change is needed in response to detecting at the backup node that first consensus processing for a first to-be-agreed proposal in the current epoch has not been completed within a predetermined time period. In other words, if the backup node is still waiting for a request from the current master node after a specific amount of time has elapsed since the backup node did not receive a request from the current master node, the backup node can determine that an epoch change is needed. For example, the current master node may encounter a Byzantine fault or a crash fault, so the current master node cannot multicast a request within a predetermined time window. The epoch change process discussed here allows a system to continue working when the master node fails, so as to provide existence and reduce network waiting time.

In the present disclosure, the detecting that first consensus processing for a first to-be-agreed proposal has not been completed within a predetermined time period can include but is not limited to the following: The master node device does not initiate the first to-be-agreed proposal; the master node device initiates an incorrect first to-be-agreed proposal; and a consensus stage for the first to-be-agreed proposal does not reach an agreement on the Quorum number and consensus cannot be completed.

When the backup node determines that an epoch change is needed, at block 704, the backup node (e.g., $R_0$) generates a first random number. In an example of the present disclosure, the first random number can be generated by using a verifiable random function (VRF) based on a second random number and a proposal number of the first to-be-agreed proposal, where the second random number is a random number generated in a master node changing process of selecting a current master node device as the master node device in the blockchain system. In addition, the backup node can further generate proof information of the first random number by using the VRF algorithm based on the second random number and the proposal number of the first to-be-agreed proposal. The proof information is used to verify the first random number.

Specifically, the backup node generates a key pair that includes a private key and a public key, and uses the second random number and the proposal number of the first to-be-agreed proposal as input parameters of the VRF function, so as to obtain the first random number by using the VRF_hash function based on the private key and the input parameters, and obtain the proof information of the first random number by using the VRF Proof function based on the private key and the input parameters.

Next, at block 706, it is determined to initiate the epoch change. For example, it is determined whether the first random number satisfies an epoch change trigger condition. Here, the epoch change trigger condition can include the following: The first random number is less than a first predetermined threshold; or the first random number is greater than a second predetermined threshold.

If the first random number satisfies the epoch change trigger condition, the backup node determines to initiate the epoch change. Then, at block 708, the backup node sends an epoch change request message (VF) to multiple network nodes other than the backup node in the blockchain system, where the VF message indicates a request for changing the current epoch based on the current master node to a new epoch based on the backup node serving as a new master node. As shown in FIG. 7, the backup node sends the VF message to network nodes 1-N.

In an example of the present disclosure, when the VRF algorithm is used to generate the first random number, the VF message can include the first random number and the proof information of the first random number. As shown in FIG. 8, a message format of the VF message can be VF<epoch+1, j, random num, random numproof>, where "epoch" represents an epoch corresponding to the current master node; j represents a node identifier of the backup node sending the VF message; random num represents the first random number; and random numproof represents the proof information of the first random number.

All network nodes that receive the VF message perform the same operation. As shown in FIG. 7, all network nodes 1-N perform the same operation. After receiving the VF message, at block 710, each network node performs epoch change request verification (epoch change request acknowledgment). For example, if the VF message includes the first random number and the proof information of the first random number, each network node can perform the epoch change request verification based on the first random number and the proof information of the first random number. Specifically, network node 1 is used as an example. Network node 1 first verifies whether the first random number can be calculated based on the proof information. When the previous verification succeeds, network node 1 continues performing verification by using the public key of the backup node, the input parameters of the VRF, and the proof information, so as to verify whether the proof information can be obtained based on the input parameters of the VRF. If the proof information can be obtained based on the input parameters of the VRF, the epoch change request verification succeeds. If the epoch change request verification succeeds, each network node generates a request acknowledgment message (EC), where the EC message indicates that the network node confirms that the backup node serves as a new master node. Then, at block 712, each network node sends the generated EC message to the backup node and other network nodes.

In an example of the present disclosure, the EC message can include the proposal number of the first to-be-agreed proposal and a node identifier of the network node sending the EC message.

In the example, the proposal number of the first to-be-agreed proposal is used to represent that the EC message is intended for the first to-be-agreed proposal, ensuring consistency in content and order of the same proposal. The node identifier is used to uniquely identify the node that sends the EC message, so that the backup node device counts the number of received EC messages.

In another example of the present disclosure, the EC message can further include second-stage consensus commitment information and third-stage consensus commitment information that are made by the network node sending the EC message during the first consensus processing. The "network node sending the EC message" is briefly referred to as a "sending network node" in the following.

In an example of the present disclosure, as shown in FIG. 8, a message format of the EC message can be EC<epoch+1, E, W, j>, where "epoch" represents the epoch corresponding to the current master node; j represents the node identifier of the backup node sending the VF message; E represents the second-stage consensus commitment information made by the network node sending the EC message during the first consensus processing; and W represents the third-stage consensus commitment information made by the network node sending the EC message during the first consensus processing.

In the example, the second stage is the prepare stage 330 shown in FIG. 3. The prepare stage 330 is triggered when the sending network node receives the Pre-prepare message. After receiving the Pre-prepare message, the sending network node uses the private key to sign the Pre-prepare message to obtain a sign_proof. At the prepare stage 330, the Prepare message sent by the sending network node includes a sign_proof. The sign_proof can be used to represent the consensus commitment made by the sending network node at the prepare stage 330.

For example, as shown in FIG. 8, a format of the second-stage consensus commitment information can be E{<epoch, seq, sign_proof, i>}, where "E" represents the second-stage consensus commitment information; "epoch" represents the epoch in which the first consensus processing is performed; "seq" represents the proposal number of the first to-be-agreed proposal; "i" represents the node identifier of the sending network node; and "sign_proof" represents the signature of the sending network node for the Pre-prepare message.

In the example, the third stage is the commit stage 340 shown in FIG. 3. The commit stage 340 is triggered when the sending network node receives the Prepare messages from other nodes. The sending network node will receive multiple Prepare messages, and each Prepare message includes one sign_proof. As such, the sending network node can obtain multiple sign_proofs. A set of the multiple sign_proofs and the local sign_proof of the sending network node is sign_proofs.

At the commit stage 340, the EC message sent by the sending network node includes sign_proofs. The sign_proofs can be used to represent the consensus commitment made by the sending network node at the commit stage 340.

$R_1$ shown in FIG. 3 is used as an example. The Prepare messages received by $R_1$ from $R_2$ and $R_3$ are PREPARE2 and PREPARE3 respectively, where PREPARE2 includes sign_proof2, and PREPARE3 includes sign_proof3 and local sign_proof1 of $R_1$. The sign_proofs included in the Commit message sent at the commit stage 340 include sign_proof1, sign_proof2, and sign_proof3.

For example, as shown in FIG. 8, a format of the third-stage consensus commitment information can be W{<epoch, seq, sign_proofs, i>}, where "W" represents the third-stage consensus commitment information; "sign_proofs" represents a set of signatures of correct node devices; and meanings of "epoch", "seq", and "i" in W are the same as the meanings of "epoch", "seq", and "i" in E.

Next, at block 714, the backup node determines whether the epoch change request is acknowledged. Specifically, in response to the fact that the number of received EC messages is greater than a predetermined number, the backup node determines that the epoch change request is acknowledged by most network nodes in the blockchain network and can serve as the master node of the new epoch.

In the present disclosure, the predetermined number can be Quorum-1, for example, when Quorum is 2f+1, the predetermined number is 2f, where f represents the maximum number of faulty nodes that the network can tolerate.

Then, at block 716, the backup node sends an epoch change acknowledgment message (NE) to the other network nodes in the blockchain network. The NE message is used to notify the other network nodes in the blockchain network that the backup node is the master node of the new epoch.

In an example of the present disclosure, the NE message can include the proposal number of the first to-be-agreed proposal and a node identifier of the backup node. In addition, the NE message can further include a second-stage consensus commitment information set (E') and a third-stage consensus commitment information set (W') that are made by each network node sending the request acknowledgment message (EC) during the first consensus processing.

As shown in FIG. 8, a message format of the NE message can be NE<epoch+1, j, seq, E', W'>, where "epoch" represents the epoch corresponding to the current master node; j represents the node identifier of the backup node sending the NE message; E' represents the second-stage consensus commitment information set made by the network node sending the EC message during the first consensus processing; and W' represents the third-stage consensus commitment information set made by the network node sending the EC message during the first consensus processing.

In the example, the proposal number of the first to-be-agreed proposal is used to represent that the NE message is intended for the first to-be-agreed proposal, ensuring consistency in content and order of the same proposal. The node identifier is used to notify the other nodes (i.e., the network nodes 1-N in FIG. 7) of the node that serves as the new master node. As such, all nodes in the blockchain system are aware of the new master node, thereby facilitating later operations.

In the example, the backup node receives multiple EC messages from the other network nodes, and each EC message includes the second-stage consensus commitment information and the third-stage consensus commitment information made by the network node sending the EC message. As such, the backup node can obtain the second-stage consensus commitment information made by the other network nodes during the first consensus processing. A set of the obtained second-stage consensus commitment information is the second-stage consensus commitment information set. In addition, the backup node can further obtain the third-stage consensus commitment information made by the other network node devices during the first consensus processing. A set of the obtained third-stage consensus commitment information is the third-stage consensus commitment information set.

For example, $R_0$ receives the verification success messages EC1, EC2, and EC3 that are sent by $R_1$, $R_2$, and $R_3$ respectively. The second-stage consensus commitment information included in EC1 is E1, and the third-stage consensus commitment information included in EC1 is W1. The second-stage consensus commitment information included in EC2 is E2, and the third-stage consensus commitment information included in EC2 is W2. The second-stage consensus commitment information included in EC3 is E3, and the third-stage consensus commitment information included in EC3 is W3. The second-stage consensus commitment information set included in the master change acknowledgment message sent by $R_0$ includes E1, E2, and E3, and the third-stage consensus commitment information set included in the master change acknowledgment message includes W1, W2, and W3.

By using the second-stage consensus commitment information set and the third-stage consensus commitment information set in the example, the backup nodes in the blockchain system can synchronize data for the first to-be-agreed proposal during the first consensus processing, so that the unfinished consensus processing in the epoch continues to be completed in the epoch+1.

In addition, optionally, in an example of the present disclosure, a network node (e.g., network node 1) can receive an epoch change request message from at least two backup node devices. To be specific, the first random number generated by each of the at least two backup node devices satisfies an epoch change trigger condition, each of the at least two backup node devices sends an epoch change request message to network node 1, and each epoch change request message includes a first random number.

In such case, network node 1 can determine a to-be-verified epoch change request message based on the first random number in each epoch change request message, and then perform epoch change request verification on the determined to-be-verified epoch change request message. Specifically, network node 1 can determine an epoch change request message with the first random number meeting the predetermined condition as the to-be-verified epoch change request message. For example, the predetermined condition can be as follows: The first random number is the smallest; the first random number is the largest; or other suitable conditions for unique determining.

The consensus process and the master node changing process according to the implementations of the present disclosure are described above with reference to FIG. 1 to FIG. 8. The following describes the epoch changing apparatus and corresponding nodes according to the implementations of the present disclosure with reference to FIG. 9 to FIG. 11.

Figure 9:
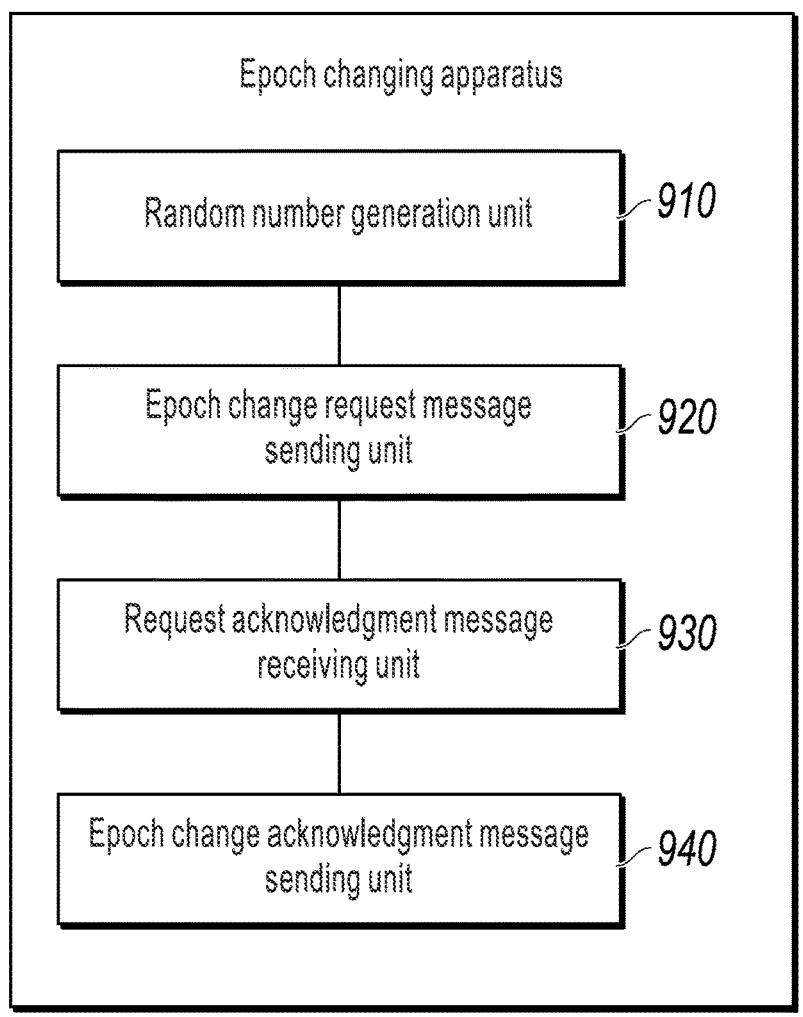
FIG. 9 is a block diagram illustrating an apparatus for changing a master node in a blockchain system, according to an implementation of the present disclosure.

FIG. 9 is a block diagram illustrating an apparatus 900 for changing a master node in a blockchain system (hereinafter referred to as an epoch changing apparatus), according to an implementation of the present disclosure. The blockchain system includes multiple network nodes, and the multiple network nodes include a master node and at least one backup node. The epoch changing apparatus 900 is located in the backup node.

As shown in FIG. 9, the epoch changing apparatus 900 includes a random number generation unit 910, an epoch change request message sending unit 920, a request acknowledgment message receiving unit 930, and an epoch change acknowledgment message sending unit 940.

The random number generation unit 910 is configured to generate a first random number when it is determined that an epoch change is needed, where the epoch change causes a current epoch based on a current master node to be changed to a new epoch based on a new master node. For operations of the random number generation unit 910, references can be made to the operations of block 704 described above with reference to FIG. 7.

The epoch change request message sending unit 920 is configured to send an epoch change request message (VF) to multiple network nodes other than the backup node in the blockchain system if the first random number satisfies an epoch change trigger condition, where the VF message indicates a request for changing the current epoch based on the current master node to a new epoch based on the backup node serving as a new master node. For operations of the epoch change request message sending unit 920, references can be made to the operations of block 708 described above with reference to FIG. 7.

In an example of the present disclosure, the VF message includes the first random number and proof information of the first random number, the first random number and the proof information of the first random number are generated by using a verifiable random function algorithm based on a second random number and a proposal number of the first to-be-agreed proposal, and the second random number is a random number generated in a master node changing process of selecting a current master node device as the master node device in the blockchain system, where request acknowledgment processing at the multiple network nodes is based on the first random number and the proof information of the first random number.

The request acknowledgment message receiving unit 930 is configured to receive a request acknowledgment message (EC) from at least one of the multiple network nodes, where the EC message indicates that the backup node serves as the new master node. For operations of the request acknowledgment message receiving unit 930, references can be made to the operations of block 712 described above with reference to FIG. 7.

In an example of the present disclosure, the EC message can include the proposal number (SEQ) of the first to-be-agreed proposal and a node identifier of the network node sending the EC message. In addition, the first consensus processing includes three-stage consensus processing, and the EC message can further include second-stage consensus commitment information (E) and third-stage consensus commitment information (W) that are made by the network node sending the EC message during the first consensus processing.

The epoch change acknowledgment message sending unit 940 is configured to send an epoch change acknowledgment message (NE) by the backup node to the multiple network nodes in response to the fact that the number of received verification success messages (EC) is greater than a predetermined number. For operations of the epoch change acknowledgment message sending unit 940, references can be made to the operations of block 716 described above with reference to FIG. 7.

In an example of the present disclosure, the NE message can include the proposal number (SEQ) of the first to-be-agreed proposal and a node identifier of the backup node. In addition, the NE message can further include a second-stage consensus commitment information set (E') and a third-stage consensus commitment information set (W') that are made by each network node sending the EC message during the first consensus processing.

In addition, the epoch changing apparatus 900 can further include an epoch change determining unit (not shown). The epoch change determining unit is configured to determine that the epoch change is needed in response to detecting that first consensus processing for a first to-be-agreed proposal in the current epoch has not been completed within a predetermined time period. For operations of the epoch change determining unit, references can be made to the operations of block 702 described above with reference to FIG. 7.

Figure 10:
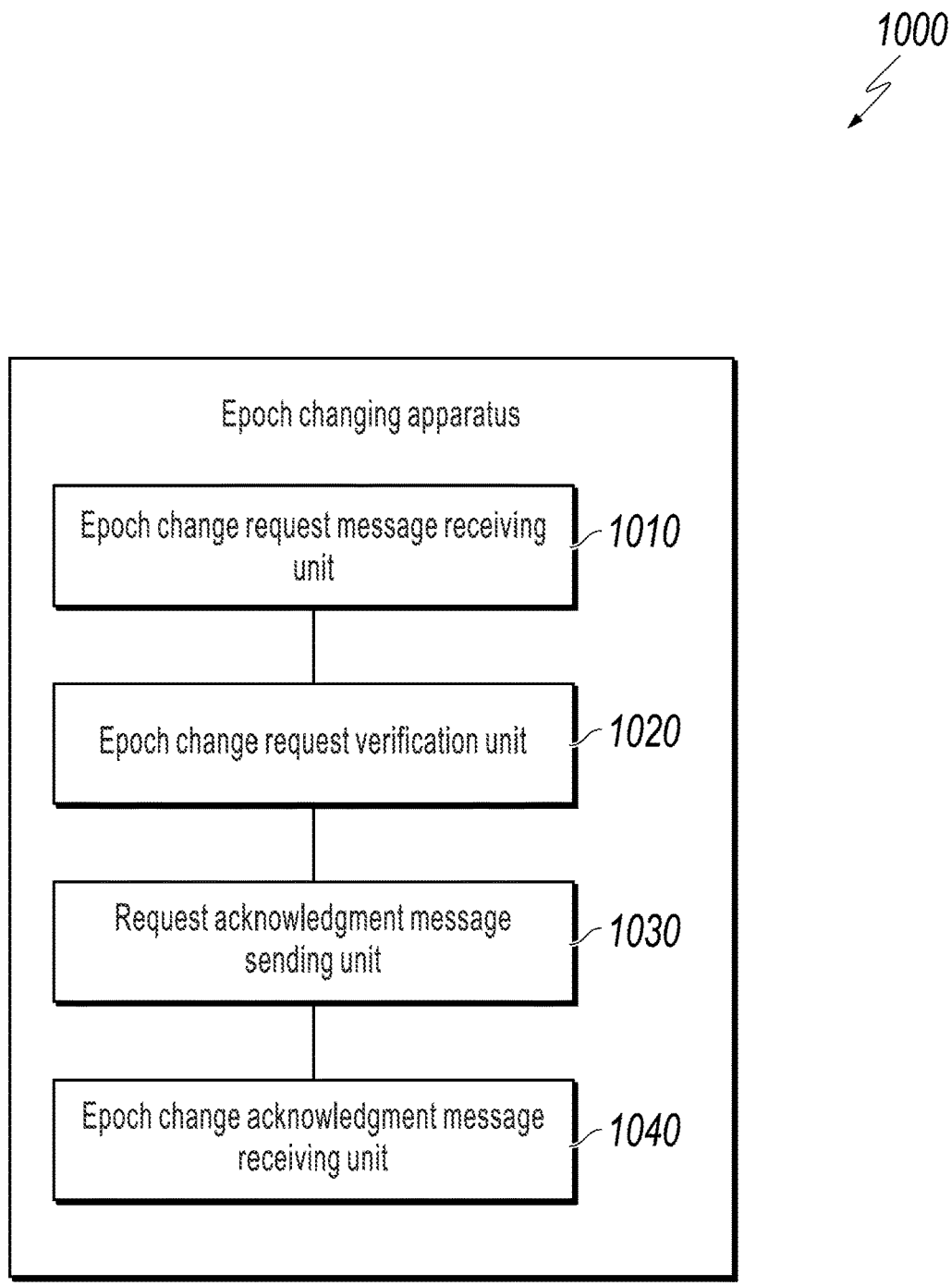
FIG. 10 is a block diagram illustrating an apparatus for changing a master node in a blockchain system, according to an implementation of the present disclosure.

FIG. 10 is a block diagram illustrating an apparatus 1000 for changing a master node in a blockchain system (hereinafter referred to as an epoch changing apparatus), according to an implementation of the present disclosure. The blockchain system includes multiple network nodes, and the multiple network nodes include a master node and at least one backup node. The epoch changing apparatus 1000 is located in a network node (hereinafter referred to as a network node) other than the backup node.

As shown in FIG. 10, the epoch changing apparatus 1000 includes an epoch change request message receiving unit 1010, an epoch change request verification unit 1020, a request acknowledgment message sending unit 1030, and an epoch change acknowledgment message receiving unit 1040.

The epoch change request message receiving unit 1010 is configured to receive an epoch change request message (VF) from a backup node, where the VF message indicates a request for changing a current epoch based on a current master node to a new epoch based on the backup node serving as a new master node. For operations of the epoch change request message receiving unit 1010, references can be made to the operations of block 708 described above with reference to FIG. 7.

The epoch change request verification unit 1020 is configured to perform epoch change request verification on the VF message. For operations of the epoch change request verification unit 1020, references can be made to the operations of block 710 described above with reference to FIG. 7.

The request acknowledgment message sending unit 1030 is configured to send a request acknowledgment message (EC) to the backup node after the epoch change request verification succeeds, where the EC message indicates that the backup node serves as the new master node. For operations of the request acknowledgment message sending unit 1030, references can be made to the operations of block 712 described above with reference to FIG. 7.

The epoch change acknowledgment message receiving unit 1040 is configured to receive an epoch change acknowledgment message (NE) from the backup node device. For operations of the epoch change acknowledgment message receiving unit 1040, references can be made to the operations of block 716 described above with reference to FIG. 7.

In addition, when the epoch change request message receiving unit of the network node receives the VF message from at least two backup node devices, the epoch change request verification unit can include an epoch change request message determining module (not shown) and an epoch change request verification module (not shown). The epoch change request message determining module is configured to determine a to-be-verified epoch change request message based on first random numbers of the at least two VF messages. The epoch change request verification module is configured to perform epoch change request verification on the determined to-be-verified epoch change request message.

Figure 11:
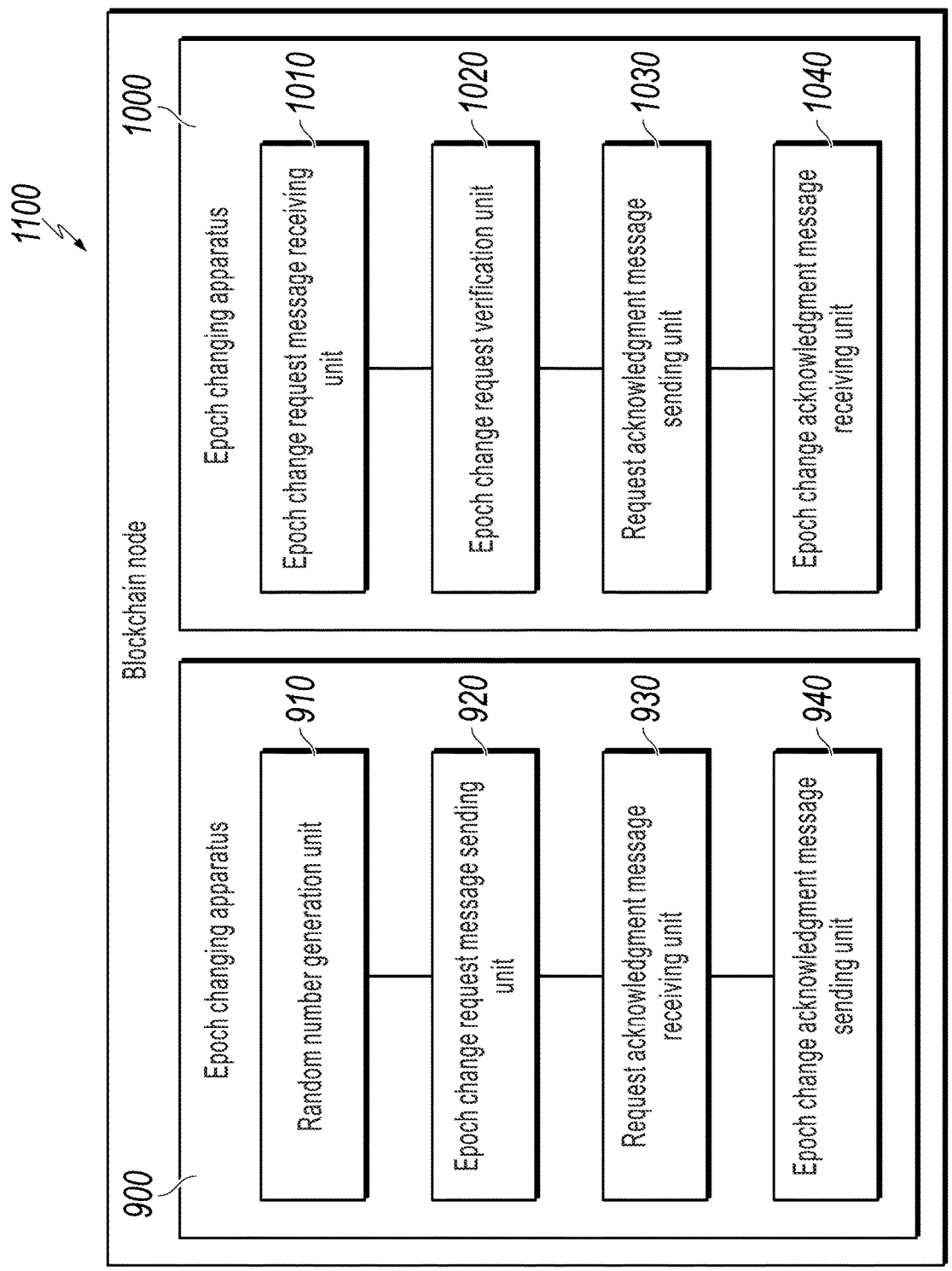
FIG. 11 is a structural block diagram illustrating a node, according to an implementation of the present disclosure.

In the present disclosure, the node can include either or both of the epoch changing apparatus shown in FIG. 9 and/or the epoch changing apparatus shown in FIG. 10. When the node includes only the epoch changing apparatus shown in FIG. 9, the node serves as the backup node that initiates the master node changing process. When the node includes only the epoch changing apparatus shown in FIG. 10, the node serves as a network node that confirms the backup node that initiates the master node changing process. When the node includes both of the epoch changing apparatuses shown in FIG. 9 and FIG. 10, the node can serve as the backup node that initiates the master node changing process, and can also serves as the network node that confirms the backup node that initiates the master node changing process. FIG. 11 is a block diagram illustrating a node that includes both of the epoch changing apparatuses shown in FIG. 9 and FIG. 10.

With reference to FIG. 1 to FIG. 11, the implementations of the method and apparatus for changing a master node in a blockchain system, and the node device according to the present disclosure are described above.

The apparatus for changing a master node in a blockchain system according to the present disclosure can be implemented by hardware, or can be implemented by software or a combination of hardware and software. For example, the apparatus is implemented by software. A logical apparatus is formed when a processor of a device where the apparatus is located reads a corresponding computer program instruction in a memory into the memory for running. In the present disclosure, the epoch changing apparatus can be implemented, for example, by using a computing device.

Figure 12:
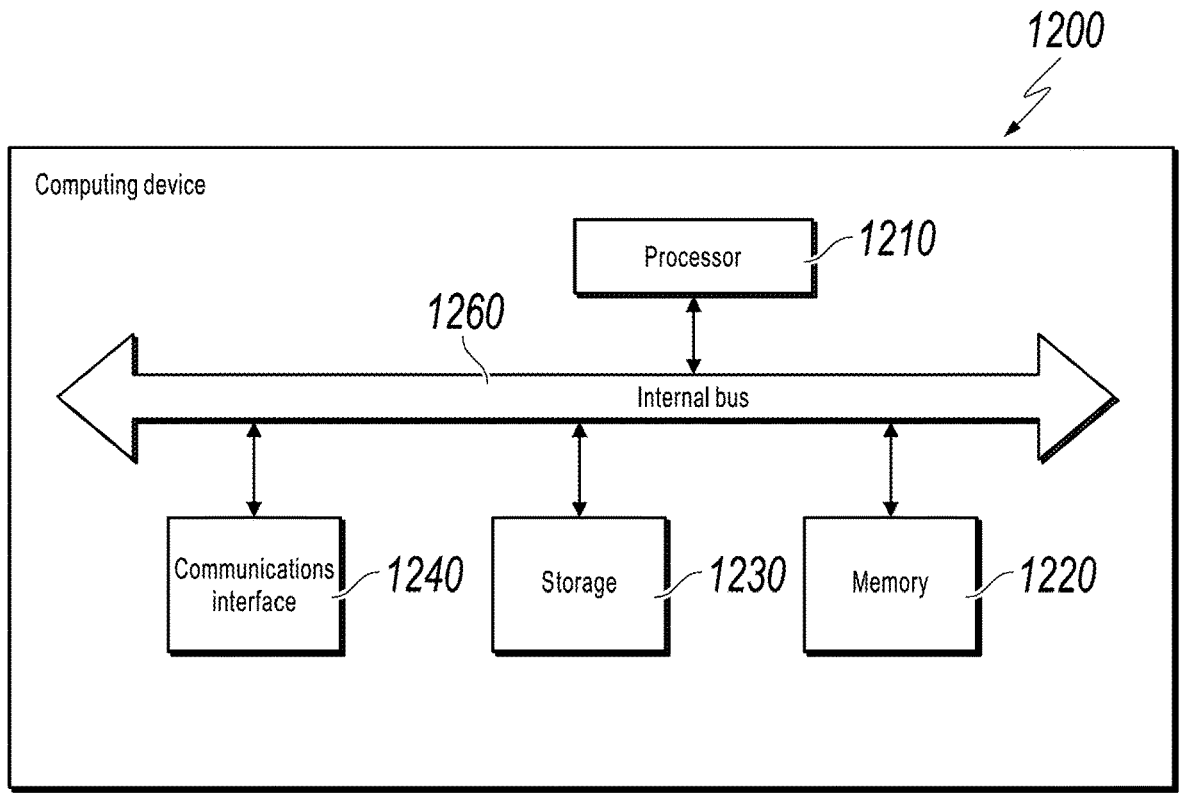
FIG. 12 is a block diagram illustrating a computing device for performing an epoch change in a blockchain system, according to an implementation of the present disclosure.

FIG. 12 is a block diagram illustrating a computing device for performing an epoch change in a blockchain system, according to an implementation of the present disclosure. As shown in FIG. 12, the computing device 1200 includes at least one processor 1210, at least one memory 1220, at least one storage 1230, and at least one communications interface 1240. The at least one processor 1210, the at least one memory 1220, the at least one storage 1230, and the at least one communications interface 1240 are interconnected by using a bus 1260. The at least one processor 1210 executes at least one computer readable instruction (i.e., the previous elements implemented in software form) stored or coded in the memory.

In an implementation, a computer executable instruction is stored in the memory, and when the instruction is executed, the at least one processor 1210 is enabled to perform the following: when determining, at a backup node, that an epoch change is needed, generating, by the backup node, a first random number, where the epoch change causes a current epoch based on a current master node to be changed to a new epoch based on a new master node; sending, by the backup node, an epoch change request message to multiple network nodes other than the backup node in the blockchain system if the first random number satisfies an epoch change trigger condition, where the epoch change request message indicates a request for changing the current epoch based on the current master node to the new epoch based on the backup node serving as the new master node; receiving, at the backup node, a request acknowledgment message from at least one of the multiple network nodes, where the request acknowledgment message indicates that the backup node serves as the new master node; and sending, by the backup node, an epoch change acknowledgment message to the multiple network nodes in response to the fact that the number of received verification success messages is greater than a predetermined number.

It should be understood that, when being executed, the computer executable instruction stored in the memory enables the at least one processor 1210 to perform the previous operations and functions described with reference to FIG. 1 to FIG. 11 in the implementations of the present disclosure.

According to an implementation, a program product such as a machine readable medium is provided. The machine readable medium can have an instruction (i.e., the previous elements implemented in software form). When the instruction is executed by a machine, the machine is enabled to perform the previous operations and functions described with reference to FIG. 1 to FIG. 11 in the implementations of the present disclosure.

Figure 13:
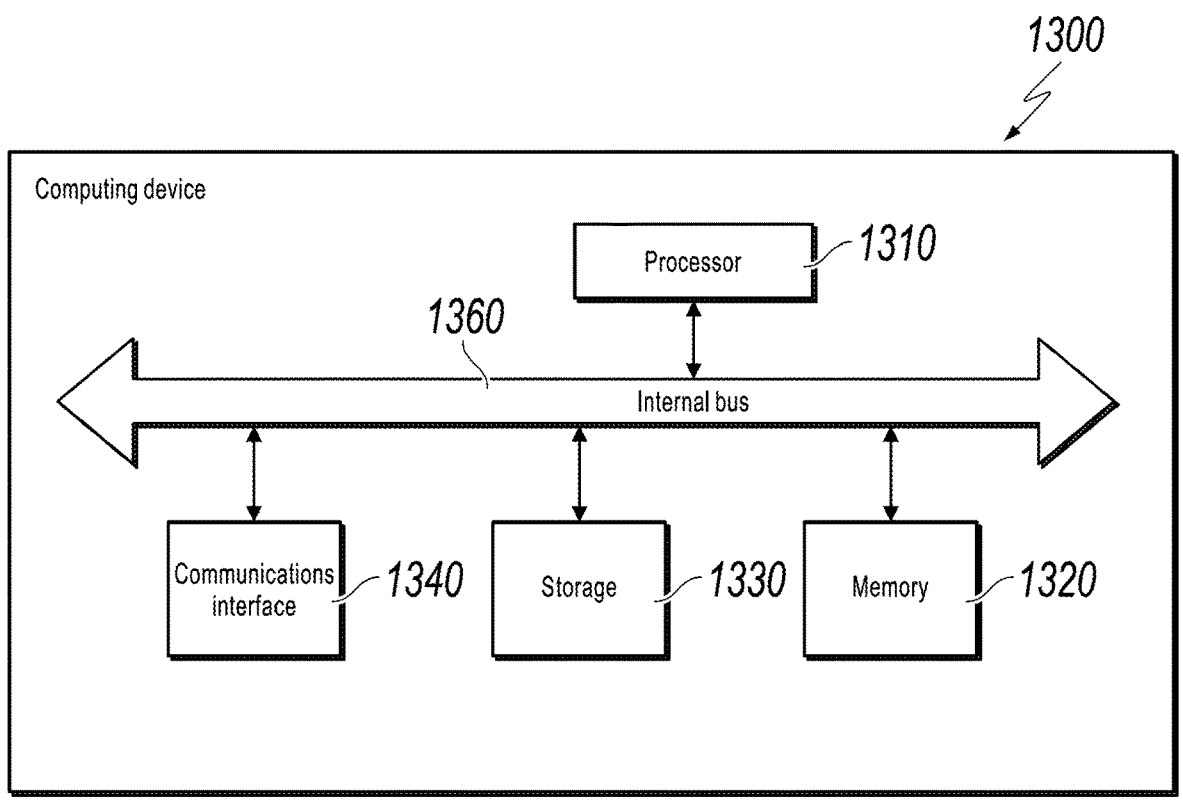
FIG. 13 is a block diagram illustrating a computing device for performing an epoch change in a blockchain system, according to an implementation of the present disclosure.

FIG. 13 is a block diagram illustrating a computing device for performing an epoch change in a blockchain system, according to an implementation of the present disclosure. As shown in FIG. 13, the computing device 1300 includes at least one processor 1310, at least one memory 1320, at least one storage 1330, and at least one communications interface 1340. The at least one processor 1310, the at least one memory 1320, the at least one storage 1330, and the at least one communications interface 1340 are interconnected by using a bus 1360. The at least one processor 1310 executes at least one computer readable instruction (i.e., the previous elements implemented in software form) stored or coded in the memory.

In an implementation, a computer executable instruction is stored in the memory, and when the instruction is executed, the at least one processor 1310 includes the following: an epoch change request message receiving unit, configured to receive an epoch change request message from a backup node, where the epoch change request message indicates a request for changing a current epoch based on a current master node to a new epoch based on the backup node serving as a new master node; an epoch change request verification unit, configured to perform epoch change request verification on the epoch change request message; a request acknowledgment message sending unit, configured to send a request acknowledgment message to the backup node after the epoch change request verification succeeds, where the request acknowledgment message indicates that the backup node serves as the new master node; and an epoch change acknowledgment message receiving unit, configured to receive an epoch change acknowledgment message from the backup node device, where the epoch change request message is sent by the backup node device when a first random number satisfies an epoch change trigger condition, the first random number is generated at the backup node device when it is determined that an epoch change is needed, and the epoch change acknowledgment message is sent by the backup node in response to the fact that the number of request acknowledgment messages received by the backup node device from a network node other than the backup node in the blockchain system exceeds a predetermined number.

It should be understood that, when being executed, the computer executable instruction stored in the memory enables the at least one processor 1310 to perform the previous operations and functions described with reference to FIG. 1 to FIG. 11 in the implementations of the present disclosure.

According to an implementation, a program product such as a machine readable medium is provided. The machine readable medium can have an instruction (i.e., the previous elements implemented in software form). When the instruction is executed by a machine, the machine is enabled to perform the previous operations and functions described with reference to FIG. 1 to FIG. 11 in the implementations of the present disclosure.

The readable storage medium provided according to the implementations of the present disclosure stores software program code that implements the functions of any of the implementations described above, and enables the computer or processor of the system or apparatus to read and execute the instruction stored in the readable storage medium.

In such case, the program code read from the readable medium can implement the functions of any of the implementations described above, so that the machine readable code and the readable storage medium storing the machine readable code form a part of the present disclosure.

Implementations of the readable storage medium include a floppy disk, a hard disk, a magneto-optical disk, an optical disk (such as a CD-ROM, a CD-R, a CD-RW, a DVD-ROM, a DVD-RAM, a DVD-RW, and a DVD-RW), a magnetic tape, a non-volatile memory card, and a ROM. Alternatively, the program code can be downloaded from a server computer or cloud by a communications network.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

Not all the steps and units in the above-mentioned processes and system structure diagrams are necessary, and some steps or units can be ignored depending on a demand. The sequence of steps is not fixed and can be determined depending on a demand. The apparatus structure described in the previous implementations can be a physical structure or a logical structure, that is, some units can be implemented by a same physical entity, or some units can be implemented by multiple physical entities, or can be implemented jointly by some of the multiple independent devices.

The term "illustrative" as used throughout the present specification means "used as an example, an instance, or illustration" and does not mean "preferred" or "advantageous" over other implementations. Specific implementations include specific details for the purpose of providing an understanding of the described technology. However, these technologies can be implemented without these specific details. In some examples, well-known structures and devices are shown in block diagrams in order to avoid making it difficult to understand the concepts of the described implementations.

An optional implementation of the implementations of the present disclosure is described above in detail with reference to the accompanying drawings. However, the implementations of the present disclosure are not limited to the specific details of the previous implementation. Within the technical concept of the implementations of the present disclosure, various simple variations of the technical solutions of the implementations of the present disclosure can be carried out. These simple variations are all within the protection scope of the implementations of the present disclosure.

The previous descriptions of the present disclosure are provided to enable any person of ordinary skill in the art to implement or use the present disclosure. Various modifications to the present disclosure are apparent to a person of ordinary skill in the art, and the general principles defined in the present specification can also be applied to other variations without departing from the protection scope of the present disclosure. Therefore, the present disclosure is not limited to the examples and designs described in the present specification, but is consistent with the widest range of principles and novelty characteristics compliant with the present disclosure.

What is claimed is:

1. A method comprising:
    determining, at a backup node in a blockchain system, that an epoch change is to occur in the blockchain system, the blockchain system including multiple network nodes, the multiple network nodes including a current master node and a plurality of backup nodes;
    in response to determining that the epoch change is to occur in the blockchain system, generating, by the backup node, a first random number;
        in response to determining that the first random number satisfies an epoch change trigger condition, sending, by the backup node, an epoch change request message to multiple network nodes other than the backup node in the blockchain system to initiate the epoch change, wherein the epoch change request message indicates a request for changing a current epoch with the current master node to a new epoch with the backup node serving as a new master node, and wherein the epoch change request message comprises the first random number and proof information of the first random number, the first random number and the proof information of the first random number having been generated by using a verifiable random function algorithm, such that a number of backup nodes that concurrently attempt to initiate the epoch change is fewer than all backup nodes in the blockchain system;
    receiving, at the backup node, a request acknowledgement message from at least one of the multiple network nodes, wherein the request acknowledgement message indicates that the backup node is to serve as the new master node; and
    in response to receiving, at the backup node, a number of request acknowledgment messages that is greater than a predetermined number of messages, sending, by the backup node to the multiple network nodes, an epoch change acknowledgement message.

2. The method according to claim 1, wherein the epoch change trigger condition comprises the first random number being less than a first predetermined threshold, or the first random number being greater than a second predetermined threshold.

3. The method according to claim 1, wherein the request acknowledgment message comprises a proposal number of a proposal in the current epoch and a node identifier of a network node sending the request acknowledgment message.

4. The method according to claim 3, wherein the epoch change acknowledgment message comprises the proposal number of the proposal in the current epoch and a node identifier of the backup node.

5. The method according to claim 1, wherein determining, at the backup node in the blockchain system, that the epoch change is to occur comprises:
    determining, at the backup node, that consensus processing for a proposal in the current epoch has not been completed within a predetermined time period.

6. The method according to claim 5, wherein the verifiable random function algorithm is based on a second random number and a proposal number of the proposal in the current epoch, the second random number having been generated in a master node changing process of selecting the current master node for the current epoch; and
    the request acknowledgement message is provided by the at least one of the multiple network nodes, based on the first random number and the proof information of the first random number.

7. The method according to claim 5, wherein the consensus processing comprises three-stage consensus processing, and the request acknowledgment message comprises second-stage consensus commitment information and third-stage consensus commitment information that had been made by a network node sending the request acknowledgment message.

8. The method according to claim 7, wherein the epoch change acknowledgment message further comprises a second-stage consensus commitment information set and a third-stage consensus commitment information set that includes information from each network node sending the request acknowledgment message.

9. A computer-implemented system, comprising:
    one or more computers; and
    one or more computer memory devices interoperably coupled with the one or more computers and having tangible, non-transitory, machine-readable media storing one or more instructions that, when executed by the one or more computers, perform operations comprising:
    determining, at a backup node in a blockchain system, that an epoch change is to occur in the blockchain system, the blockchain system including multiple network nodes, the multiple network nodes including a current master node and a plurality of backup nodes;
        in response to determining that the epoch change is to occur in the blockchain system, generating, by the backup node, a first random number;
        in response to determining that the first random number satisfies an epoch change trigger condition, sending, by the backup node, an epoch change request message to multiple network nodes other than the backup node in the blockchain system to initiate the epoch change, wherein the epoch change request message indicates a request for changing a current epoch with the current master node to a new epoch with the backup node serving as a new master node, and wherein the epoch change request message comprises the first random number and proof information of the first random number, the first random number and the proof information of the first random number having been generated by using a verifiable random function algorithm, such that a number of backup nodes that concurrently attempt to initiate the epoch change is fewer than all backup nodes in the blockchain system;

receiving, at the backup node, a request acknowledgement message from at least one of the multiple network nodes, wherein the request acknowledgement message indicates that the backup node is to serve as the new master node; and in response to receiving, at the backup node, a number of request acknowledgement messages that is greater than a predetermined number of messages, sending, by the backup node to the multiple network nodes, an epoch change acknowledgement message.

10. The system according to claim 9, wherein the epoch change trigger condition comprises the first random number being less than a first predetermined threshold, or the first random number being greater than a second predetermined threshold.

11. The system according to claim 9, wherein the request acknowledgment message comprises a proposal number of a proposal in the current epoch and a node identifier of a network node sending the request acknowledgment message.

12. The system according to claim 11, wherein the epoch change acknowledgment message comprises the proposal number of the proposal in the current epoch and a node identifier of the backup node.

13. The system according to claim 9, wherein determining, at the backup node in the blockchain system, that the epoch change is to occur comprises:
    determining, at the backup node, that consensus processing for a proposal in the current epoch has not been completed within a predetermined time period.

14. The system according to claim 13, wherein the verifiable random function algorithm is based on a second random number and a proposal number of the proposal in the current epoch, the second random number having been generated in a master node changing process of selecting the current master node for the current epoch; and
    the request acknowledgement message is provided by the at least one of the multiple network nodes, based on the first random number and the proof information of the first random number.

15. The system according to claim 13, wherein the consensus processing comprises three-stage consensus processing, and the request acknowledgment message comprises second-stage consensus commitment information and third-stage consensus commitment information that had been made by a network node sending the request acknowledgment message.

16. The system according to claim 15, wherein the epoch change acknowledgment message further comprises a second-stage consensus commitment information set and a third-stage consensus commitment information set that includes information from each network node sending the request acknowledgment message.

17. A non-transitory, computer-readable medium storing one or more instructions executable by a computer system to perform operations comprising:
    determining, at a backup node in a blockchain system, that an epoch change is to occur in the blockchain system, the blockchain system including multiple network nodes, the multiple network nodes including a current master node and a plurality of backup nodes;
    in response to determining that the epoch change is to occur in the blockchain system, generating, by the backup node, a first random number;
    in response to determining that the first random number satisfies an epoch change trigger condition, sending, by the backup node, an epoch change request message to multiple network nodes other than the backup node in the blockchain system to initiate the epoch change, wherein the epoch change request message indicates a request for changing a current epoch with the current master node to a new epoch with the backup node serving as a new master node, and wherein the epoch change request message comprises the first random number and proof information of the first random number, the first random number and the proof information of the first random number having been generated by using a verifiable random function algorithm, such that a number of backup nodes that concurrently attempt to initiate the epoch change is fewer than all backup nodes in the blockchain system;
    receiving, at the backup node, a request acknowledgement message from at least one of the multiple network nodes, wherein the request acknowledgement message indicates that the backup node is to serve as the new master node; and
    in response to receiving, at the backup node, a number of request acknowledgement messages that is greater than a predetermined number of messages, sending, by the backup node to the multiple network nodes, an epoch change acknowledgement message.

18. The computer-readable medium according to claim 17, wherein the epoch change trigger condition comprises the first random number being less than a first predetermined threshold, or the first random number being greater than a second predetermined threshold.

19. The computer-readable medium according to claim 17, wherein the request acknowledgment message comprises a proposal number of a proposal in the current epoch and a node identifier of a network node sending the request acknowledgment message.

20. The computer-readable medium according to claim 17, wherein determining, at the backup node in the blockchain system, that the epoch change is to occur comprises:
    determining, at the backup node, that consensus processing for a proposal in the current epoch has not been completed within a predetermined time period.

\* \* \* \* \*